(12) United States Patent
Noda et al.

(10) Patent No.: US 9,448,052 B2
(45) Date of Patent: Sep. 20, 2016

(54) SHAPE MEASURING APPARATUS AND CONTROL METHOD OF SHAPE MEASURING APPARATUS

(71) Applicant: MITUTOYO CORPORATION, Kanagawa (JP)

(72) Inventors: Takashi Noda, Tochigi (JP); Hiromi Deguchi, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 584 days.

(21) Appl. No.: 13/941,880

(22) Filed: Jul. 15, 2013

(65) Prior Publication Data

US 2014/0025336 A1    Jan. 23, 2014

(30) Foreign Application Priority Data

Jul. 20, 2012  (JP) .................................. 2012-161772

(51) Int. Cl.

| G05B 11/01 | (2006.01) |
| G01B 5/20 | (2006.01) |
| G01B 21/20 | (2006.01) |
| G06F 17/40 | (2006.01) |
| G06F 19/00 | (2011.01) |
| G01B 5/008 | (2006.01) |
| G01B 21/04 | (2006.01) |

(52) U.S. Cl.
CPC ................. G01B 5/008 (2013.01); G01B 5/20 (2013.01); G01B 21/042 (2013.01); G01B 21/20 (2013.01); G05B 11/01 (2013.01); G06F 17/40 (2013.01); G06F 19/00 (2013.01)

(58) Field of Classification Search
None
See application file for complete search history.

(56) References Cited

U.S. PATENT DOCUMENTS

| 3,866,179 A | * | 2/1975 | McGee | .............. | G05B 19/4103 |
| | | | | | 318/572 |
| 5,726,917 A | | 3/1998 | Staaden | | |
| 5,994,863 A | * | 11/1999 | Fujita | ................... | G05B 19/416 |
| | | | | | 318/568.15 |
| 7,354,268 B2 | | 4/2008 | Raby et al. | | |

(Continued)

FOREIGN PATENT DOCUMENTS

| JP | H04-109317 A | 4/1992 |
| JP | 2002-108955 A | 4/2002 |

(Continued)

OTHER PUBLICATIONS

EPO Search Report mailed Jun. 16, 2015 in European Application No. 13176698.2.

*Primary Examiner* — Edward Cosimano
(74) *Attorney, Agent, or Firm* — Greenblum & Bernstein, P.L.C.

(57) ABSTRACT

A control method of a shape measuring apparatus divides a curve indicating a movement path of a probe into a plurality of sections. A measurement target section is selected from the plurality of sections sequentially from a starting point side of the curve indicating the movement path of the probe. A first curvature radius is calculated from a curvature of the measurement target section. A second curvature radius is calculated according to an angle between a first straight line connecting a starting point to an ending point of the measurement target section and a second straight line connecting a starting point to an ending point of a section next to the measurement target section. A smaller value from among the first curvature radius and the second curvature radius is set as an effective radius. A maximum speed of probe movement increasing according to an increase in the effective radius is calculated for the measurement target section.

15 Claims, 19 Drawing Sheets

(56) References Cited

U.S. PATENT DOCUMENTS

| | | | |
|---|---|---|---|
| 7,392,692 B2 * | 7/2008 | Noda | G01B 5/008 |
| | | | 33/503 |
| 7,643,963 B2 * | 1/2010 | Noda | G01B 5/008 |
| | | | 702/168 |
| 7,908,759 B2 | 3/2011 | McLean et al. | |
| 2005/0263727 A1 | 12/2005 | Noda | |
| 2008/0236260 A1 | 10/2008 | Noda et al. | |
| 2010/0050837 A1 | 3/2010 | Ould et al. | |

FOREIGN PATENT DOCUMENTS

| | | |
|---|---|---|
| JP | 2003-108210 A | 4/2003 |
| JP | 2003-202219 | 7/2003 |
| JP | 2008-114333 A | 5/2008 |
| JP | 2008-515541 A | 5/2008 |
| JP | 2008-241420 | 10/2008 |
| JP | 2008-539431 A | 11/2008 |
| JP | 2009-266000 A | 11/2009 |

* cited by examiner

| A [degree] | Vd1 [mm/sec] |
|---|---|
| 0≦A<5 | NO LIMIT |
| 5≦A<10 | 40 |
| 10≦A<15 | 30 |
| 15≦A<20 | 20 |
| 20≦A<25 | 10 |
| 25≦A<35 | 5 |
| 35≦A<45 | 2.5 |
| 45≦A<180 | error |

FIG. 12

| PATTERN | PATTERN DIAGRAM | MAXIMUM SPEED Vmax |
|---|---|---|
| 1 | VSi ramp up to VFi | VFi |
| 2 | VSi ramp up then flat to VFi | VFi |
| 3 | VSi up to VUi then down to VFi | VUi |
| 4 | VSi up to VBi plateau then down to VFi | VBi |
| 5 | VSi flat to VFi | VSi (VFi) |
| 6 | VSi ramp down to VFi | VSi |
| 7 | VSi flat then down to VFi | VSi |
| 8 | VSi up to VUi then down to VFi | VUi |
| 9 | VSi up to VBi plateau then down to VFi | VBi |

SHAPE MEASURING APPARATUS AND CONTROL METHOD OF SHAPE MEASURING APPARATUS

CROSS-REFERENCE TO RELATED APPLICATION(S)

The present application claims the benefit of priority of Japanese Patent Application No. 2012-161772, filed on Jul. 20, 2012. The disclosures of this application are incorporated herein by reference.

BACKGROUND

1. Technical Field

The present invention relates to a shape measuring apparatus and a control method of the shape measuring apparatus, and relates to a shape measuring apparatus and a control method of the shape measuring apparatus according to, for example, scanning measurement.

2. Related Art

Scanning measurement by a coordinate measuring machine is classified into autonomous scanning measurement with an unknown scanning movement path and nominal scanning measurement with a known scanning movement path. In the nominal scanning measurement of them, a straight line, a circle, combination of the straight line and the circle, a cylindrical spiral which is combination of a circle and an axial straight line of a cylinder, etc. can be used as a known scanning movement path. In the nominal scanning measurement, measured data is acquired by capturing central coordinates of a scanning probe every measurement pitch during movement on these movement paths (Patent Reference 1).

Also, in the nominal scanning measurement, measurement parameters such as a movement speed in each section ranging from a starting point to an ending point of a movement path are calculated backward from the ending point of the movement path (Patent Reference 2).

PRIOR ART REFERENCE

Patent Reference

[Patent Reference 1] JP-A-2003-202219
[Patent Reference 2] JP-A-2008-241420

However, depending on shapes of workpiece that is an object to be measured, there are cases where sufficient measurement accuracy cannot be obtained in a movement path in which simple straight lines, circles, etc. are combined. In such cases, it is necessary to measure a shape using a movement path constructed of a smooth curve in a coordinate measuring machine. In this case, in order to make measurement at high speed while scanning a curve with high accuracy, it is necessary to control a movement speed of a probe of the coordinate measuring machine based on the curve. That is, it is necessary to calculate an allowable speed (maximum speed) according to a shape of the curve so as not to deviate from the movement path in, for example, a place with a large curvature. On the other hand, Patent References 1 and 2 do not describe calculation of the maximum speed in the movement path of the curve.

SUMMARY

A control method of a shape measuring apparatus according a first aspect of the invention, comprises:
dividing a curve indicating a movement path of a probe into a plurality of sections;
selecting a measurement target section from the plurality of sections sequentially from a starting point side of the curve indicating the movement path of the probe;
calculating a first curvature radius from a curvature of the measurement target section;
calculating a second curvature radius according to an angle between a first straight line connecting a starting point to an ending point of the measurement target section and a second straight line connecting a starting point to an ending point of a section next to the measurement target section;
selecting a smaller value from among the first curvature radius and the second curvature radius as an effective radius; and
calculating a maximum speed of probe movement increasing according to an increase in the effective radius for the measurement target section.

A control method of a shape measuring apparatus according a second aspect of the invention is the above-mentioned control method of a shape measuring apparatus, comprising:
dividing the measurement target section into a plurality of division curves; and
calculating a minimum radius of a circle which has the minimum radius and passes through three continuous points of a starting point of the measurement target section, an ending point of the measurement target section and a division point at which the measurement target section is divided into the plurality of division curves as the first curvature radius.

A control method of a shape measuring apparatus according a third aspect of the invention is that in the above-mentioned control method of a shape measuring apparatus, a speed pattern for moving the probe is decided based on the maximum speed.

A control method of a shape measuring apparatus according a fourth aspect of the invention is the above-mentioned control method of a shape measuring apparatus, comprising:
comparing a first maximum speed which is the maximum speed of the measurement target section with a second maximum speed which is the maximum speed of the section next to the measurement target section; and
setting the first maximum speed as a terminal speed of the measurement target section when the first maximum speed is lower than or equal to the second maximum speed, and setting the second maximum speed as the terminal speed of the measurement target section when the first maximum speed is higher than the second maximum speed.

A control method of a shape measuring apparatus according a fifth aspect of the invention is the above-mentioned control method of a shape measuring apparatus, comprising:
when an initial speed of the measurement target section is equal to the terminal speed, selecting a speed pattern in which the probe is moved from the starting point to the ending point of the measurement target section while maintaining a constant speed at the initial speed.

A control method of a shape measuring apparatus according a sixth aspect of the invention is the above-mentioned control method of a shape measuring apparatus, comprising:
when the initial speed of the measurement target section is lower than the terminal speed, calculating a first distance of movement of the probe while accelerating from the initial speed to the terminal speed with preset acceleration; and comparing the first distance with a length of the measurement target section.

A control method of a shape measuring apparatus according a seventh aspect of the invention is the above-mentioned control method of a shape measuring apparatus, comprising:

when an initial speed of the measurement target section is higher than the terminal speed, calculating a second distance of movement of the probe while decelerating from the initial speed to the terminal speed with preset acceleration, and comparing the second distance with a length of the measurement target section.

A control method of a shape measuring apparatus according an eight aspect of the invention is the above-mentioned control method of a shape measuring apparatus, comprising:

gathering the two or more sections, in which the effective radius is within a predetermined range, of the plurality of sections as one block; and calculating a maximum speed of probe movement increasing according to an increase in a fourth curvature radius which is a representative value of the effective radius of the measurement target section included in the block for the block.

A control method of a shape measuring apparatus according a ninth aspect of the invention is the above-mentioned control method of a shape measuring apparatus, comprising:

gathering the two or more sections, in which the effective radius is within a predetermined range, of the plurality of sections as one block;

calculating a maximum speed of probe movement increasing according to an increase in a representative value of the effective radius of the measurement target section included in the block; and selecting the speed pattern for moving the probe in the block.

A control method of a shape measuring apparatus according a tenth aspect of the invention is that in the above-mentioned control method of a shape measuring apparatus, the representative value is an average value of the effective radii of the measurement target section included in the block.

A control method of a shape measuring apparatus according an eleventh aspect of the invention is that in the above-mentioned control method of a shape measuring apparatus, the curve indicating the movement path of the probe is parametric cubic curves.

A shape measuring apparatus according a twelfth aspect of the invention is a shape measuring apparatus, comprising:

a path information division module configured to divide a curve indicating a movement path of a probe into a plurality of sections; and a movement speed calculation module configured to select a measurement target section from the plurality of sections sequentially from a starting point side of the curve indicating the movement path of the probe and calculating a maximum speed of probe movement for the measurement target section, wherein the path information division module is configured to calculate a first curvature radius from a curvature of the measurement target section, and the movement speed calculation module comprises:

a second radius calculation module configured to calculate a second curvature radius according to an angle between a first straight line connecting a starting point to an ending point of the measurement target section and a second straight line connecting a starting point to an ending point of a section next to the measurement target section, an effective radius setting module configured to select a smaller value from among the first curvature radius and the second curvature radius as an effective radius, and a maximum speed calculation module configured to calculate a maximum speed of probe movement increasing according to an increase in the effective radius for the measurement target section.

The shape measuring apparatus according a thirteenth aspect of the invention is that in the above-mentioned shape measuring apparatus, the path information division module divides the measurement target section into a plurality of division curves, and calculates a minimum radius of a circle which has the minimum radius and passes through three continuous points of a starting point of the measurement target section, an ending point of the measurement target section and a division point at which the measurement target section is divided into the plurality of division curves as the first curvature radius.

The shape measuring apparatus according a fourteenth aspect of the invention is the above-mentioned shape measuring apparatus comprising:

a speed pattern selection module configured to select a speed pattern for moving the probe based on the maximum speed.

The shape measuring apparatus according a fifteenth aspect of the invention is that in the above-mentioned shape measuring apparatus, the speed pattern selection module compares a first maximum speed which is the maximum speed of the measurement target section with a second maximum speed which is the maximum speed of the section next to the measurement target section, and sets the first maximum speed as a terminal speed of the measurement target section when the first maximum speed is lower than or equal to the second maximum speed, and sets the second maximum speed as the terminal speed of the measurement target section when the first maximum speed is higher than the second maximum speed.

The shape measuring apparatus according a sixteenth aspect of the invention is that in the above-mentioned shape measuring apparatus, when an initial speed of the measurement target section is equal to the terminal speed, the speed pattern selection module selects a speed pattern in which a constant speed is maintained at the initial speed and the probe is moved from the starting point to the ending point of the measurement target section.

The shape measuring apparatus according a seventeenth aspect of the invention is that in the above-mentioned shape measuring apparatus, when the initial speed of the measurement target section is lower than the terminal speed, the speed pattern selection module calculates a first distance of movement of the probe while accelerating from the initial speed to the terminal speed with preset acceleration, and compares the first distance with a length of the measurement target section.

The shape measuring apparatus according an eighteenth aspect of the invention is that in the above-mentioned shape measuring apparatus, when an initial speed of the measurement target section is higher than the terminal speed, the speed pattern selection module calculates a second distance of movement of the probe while decelerating from the initial speed to the terminal speed with preset acceleration, and compares the second distance with a length of the measurement target section.

The shape measuring apparatus according a nineteenth aspect of the invention is that in the above-mentioned shape measuring apparatus, the movement speed calculation module gathers the two or more sections, in which the effective radius is within a predetermined range, of the plurality of sections as one block, and calculates a maximum speed of probe movement increasing according to an increase in a fourth curvature radius which is a representative value of the effective radius of the measurement target section included in the block for the block.

The shape measuring apparatus according a twentieth aspect of the invention is that in the above-mentioned shape measuring apparatus, the representative value is an average value of the effective radii of the measurement target section included in the block.

The shape measuring apparatus according a twenty-first aspect of the invention is that in the above-mentioned shape measuring apparatus, the speed pattern selection module gathers the two or more sections, in which the effective radius is within a predetermined range, of the plurality of sections as one block, and calculates a maximum speed of probe movement increasing according to an increase in a representative value of the effective radius of the measurement target section included in the block, and selects the speed pattern for moving the probe in the block.

The shape measuring apparatus according a twenty-second aspect of the invention is that in the above-mentioned shape measuring apparatus, the representative value is an average value of the effective radii of the measurement target section included in the block.

The shape measuring apparatus according a twenty-third aspect of the invention is the above-mentioned shape measuring apparatus comprising:

a coordinate measuring machine having a first arithmetic module; and a control device which has a second arithmetic module and is configured to control the coordinate measuring machine, wherein the movement speed calculation module is included in the first arithmetic module, and the path information division module is included in the second arithmetic module.

The shape measuring apparatus according a twenty-fourth aspect of the invention is the above-mentioned shape measuring apparatus comprising:

a coordinate measuring machine having a first arithmetic module;

a control device which has a second arithmetic module and is configured to control the coordinate measuring machine; and a speed pattern section module configured to select a speed pattern for moving the probe based on the maximum speed, wherein the movement speed calculation module and the speed pattern selection module are included in the first arithmetic module, and the path information division module is included in the second arithmetic module.

The shape measuring apparatus according a twenty-fifth aspect of the invention is that in the above-mentioned shape measuring apparatus, the curve indicating the movement path of the probe is parametric cubic curves.

According to the invention, a shape measuring apparatus and a control method of the shape measuring apparatus capable of measuring a shape of a complex-shaped object to be measured can be provided.

The above and other objects, features and merits of the invention will be more completely understood from the following detailed description and the accompanying drawings. The accompanying drawings are shown only for illustration, and the invention is not limited.

BRIEF DESCRIPTION OF THE DRAWINGS

FIG. 6 is a block diagram schematically showing a configuration of a movement speed calculation module 411a.

FIG. 12 is a diagram showing patterns of changes in speed in one segment.

DETAILED DESCRIPTION

Embodiments of the invention will hereinafter be described with reference to the drawings. In each of the drawings, the same numerals are assigned to the same components, and the overlap description is omitted as necessary.

First Embodiment

Figure 1:
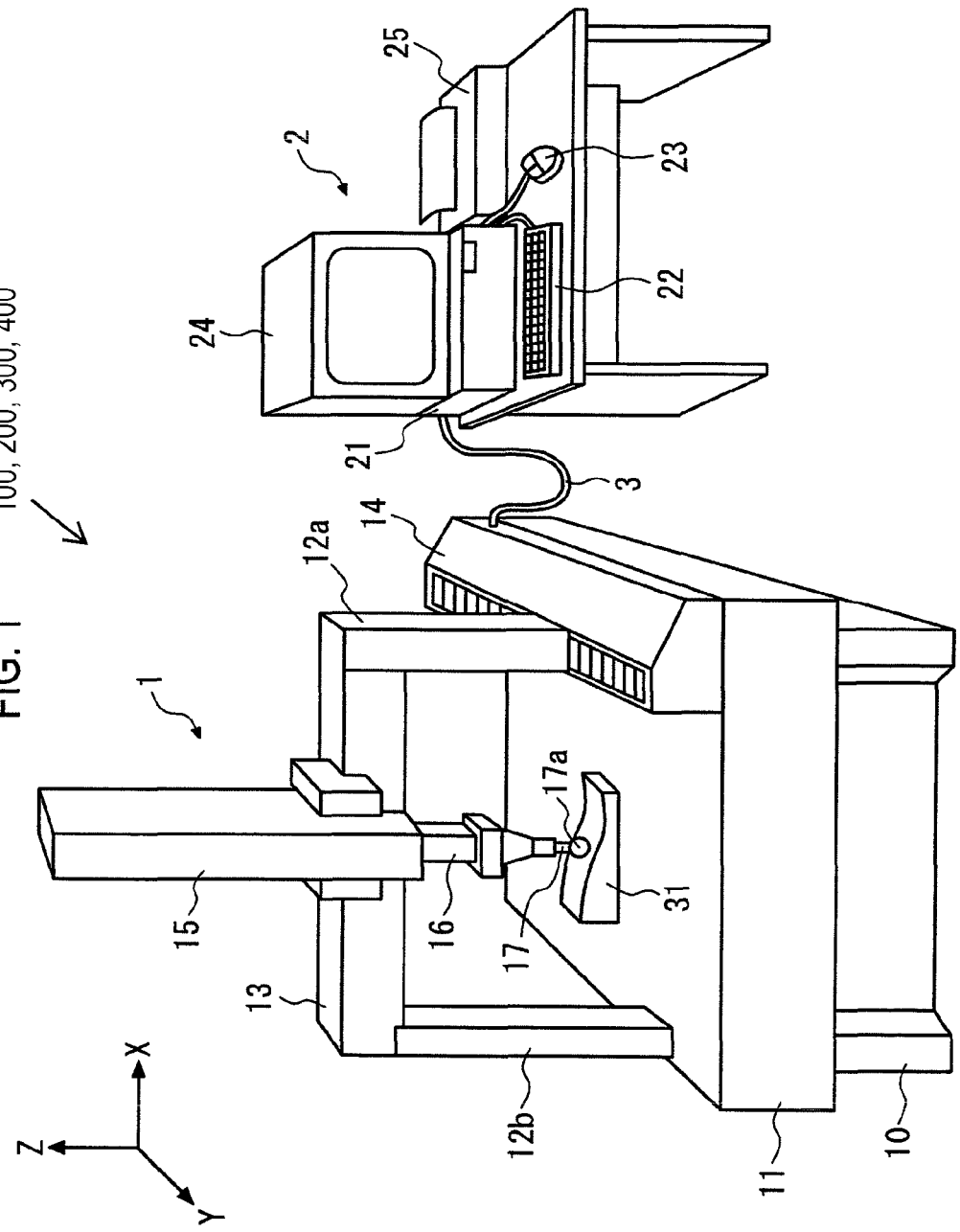
FIG. 1 is a perspective view showing an outline of an external appearance of a shape measuring apparatus according to embodiments of the disclosure.

FIG. 1 is a perspective view showing an outline of an external appearance of a shape measuring apparatus 100 according to a first embodiment. The shape measuring apparatus 100 has a coordinate measuring machine 1 and a computer 2. The computer 2 drives and controls the coordinate measuring machine 1 and captures necessary measured values through a cable 3, and also performs arithmetic processing necessary for measurement processing.

The coordinate measuring machine 1 is constructed as shown in, for example, FIG. 1, and a surface plate 11 is installed on an anti-vibration table 10 so that an upper surface (base surface) of the surface plate 11 matches with a horizontal plane (XY plane of FIG. 1). A driving mechanism 14 extending in a Y direction is installed on one end of the surface plate 11 in an X direction. A beam support body 12a is erected on the driving mechanism 14. Accordingly, the driving mechanism 14 drives the beam support body 12a in the Y direction. A beam support body 12b is erected on the other end of the surface plate 11 in the X direction. The lower end of the beam support body 12b is supported movably in a Y-axis direction by air bearings. A beam 13 supports a column 15 extending in a vertical direction (Z-axis direction). The column 15 is driven in an X-axis direction along the beam 13. The column 15 is provided with a spindle 16 driven in the Z-axis direction along the column 15. A contact probe 17 is attached to the lower end of the spindle 16. Also, a contact piece 17a (stylus tip 17a) with any shape (for example, an elliptic spherical shape) is formed on the top of the probe 17. This contact piece 17a (stylus tip 17a) makes scanning measurement on workpiece 31, and an XYZ coordinate value which is a measured result is captured in the computer 2. In addition, the computer 2 is simply called a control device.

The computer 2 has a computer body 21, a keyboard 22, a mouse 23, a monitor 24 and a printer 25 as shown in FIG. 1. As the keyboard 22, the mouse 23, the monitor 24 and the printer 25, general means can be used respectively, so that detailed description is omitted. The details of the computer body 21 will be described below.

Figure 2:
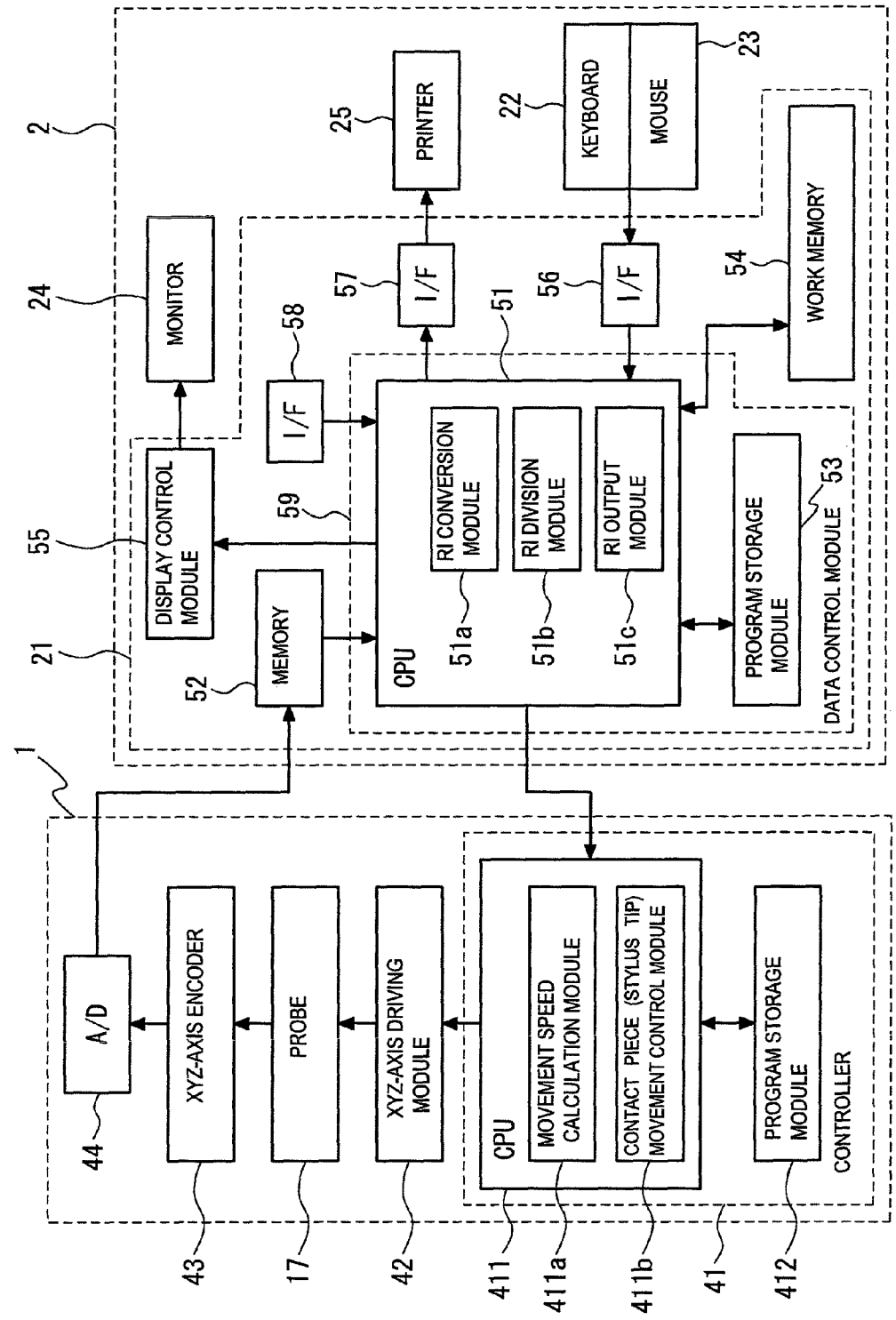
FIG. 2 is a block diagram schematically showing a configuration of the shape measuring apparatus 100 according to a first embodiment.

FIG. 2 is a block diagram schematically showing a configuration of the shape measuring apparatus 100 according to the first embodiment. As shown in FIG. 2, the coordinate measuring machine 1 has a controller 41, an XYZ-axis driving module 42, the probe 17, an XYZ-axis encoder 43, and an A/D converter 44. The XYZ-axis driving module 42 drives the probe 17 by control from the controller 41. The XYZ-axis encoder 43 detects a signal based on contact of the contact piece 17a (stylus tip 17a) on the top of the probe 17. A contact signal by contact between the contact piece 17a (stylus tip 17a) and the workpiece 31 is supplied to the computer body 21 through the A/D converter 44, and is temporarily stored in memory 52.

The controller 41 has a CPU (Central Processing Unit) 411 and a program storage module 412. The program storage module 412 is, for example, an HDD (Hard Disk Drive), and has a function of storing a program used in three-dimensional measurement. The CPU 411 reads the program out of the program storage module 412, and controls the XYZ-axis driving module 42. In addition, the CPU 411 is called a first arithmetic module. The CPU 411 executes the programs read out, and functions as a movement speed calculation module 411a and a contact piece (stylus tip) movement control module 411b.

The movement speed calculation module 411a has a function of calculating a movement speed of the contact piece 17a (stylus tip 17a) sequentially from the starting point side every plural sections based on path information (a PCC curve group etc. described below) received from the computer 2. The contact piece (stylus tip) movement control module 411b has a function of moving the contact piece 17a (stylus tip 17a) at the calculated movement speed in the section in which the movement speed is already calculated by the movement speed calculation module 411a.

The computer body 21 has a CPU 51, the memory 52, a program storage module 53, workpiece memory 54, a display control module 55, and interfaces (I/F) 56 to 58.

The CPU 51 receives instruction information (input information) about an operator inputted from the keyboard 22 and the mouse 23 through the interface 56. Also, the CPU 51 receives XYZ coordinates (input information) detected by the XYZ-axis encoder 43 and digitally converted by the A/D converter 44 through the memory 52. The CPU 51 executes, for example, analytical processing of a measured value of the workpiece 31 and stage movement by the XYZ-axis driving module 42 based on the input information, instructions of the operator and a program stored in the program storage module 53. In addition, the CPU 51 is called a second arithmetic module.

Also, the CPU 51 functions as a path information conversion module (RI conversion module) 51a, a path information division module (RI division module) 51b and a path information output module (RI output module) 51c by the programs read out.

The path information conversion module (RI conversion module) 51a has a function of converting a design value (NURBS (Non-Uniform Rational B-Spline) data) of the workpiece 31 received through the interface 58 from an external CAD system (not shown) into path information about a PCC (Parametric Cubic Curves) curve etc. The path information division module (RI division module) 51b has a function of dividing the PCC curve into plural segments (hereinafter also called a section). The path information output module (RI output module) 51c has a function of outputting path information about the PCC curve divided into the plural segments to the controller 41.

The programs stored in the program storage module 53 include, for example, a PART program in which path information used as a movement path of the workpiece 31 is programmed, and other programs for implementing the path information conversion module (RI conversion module) 51a, the path information division module (RI division module) 51b and the path information output module (RI output module) 51c.

The CPU 51 and the program storage module 53 described above function as a data control module 59 for outputting division path information generated by dividing path information based on design value data into plural sections to the controller 41.

The workpiece memory 54 provides a workpiece area for various processing of the CPU 51. The printer 25 prints a measured result etc. of the coordinate measuring machine 1 through the interface 57. The display control module 55 displays, for example, an execution screen of the PART program and measured data on the monitor 24.

Figure 3:
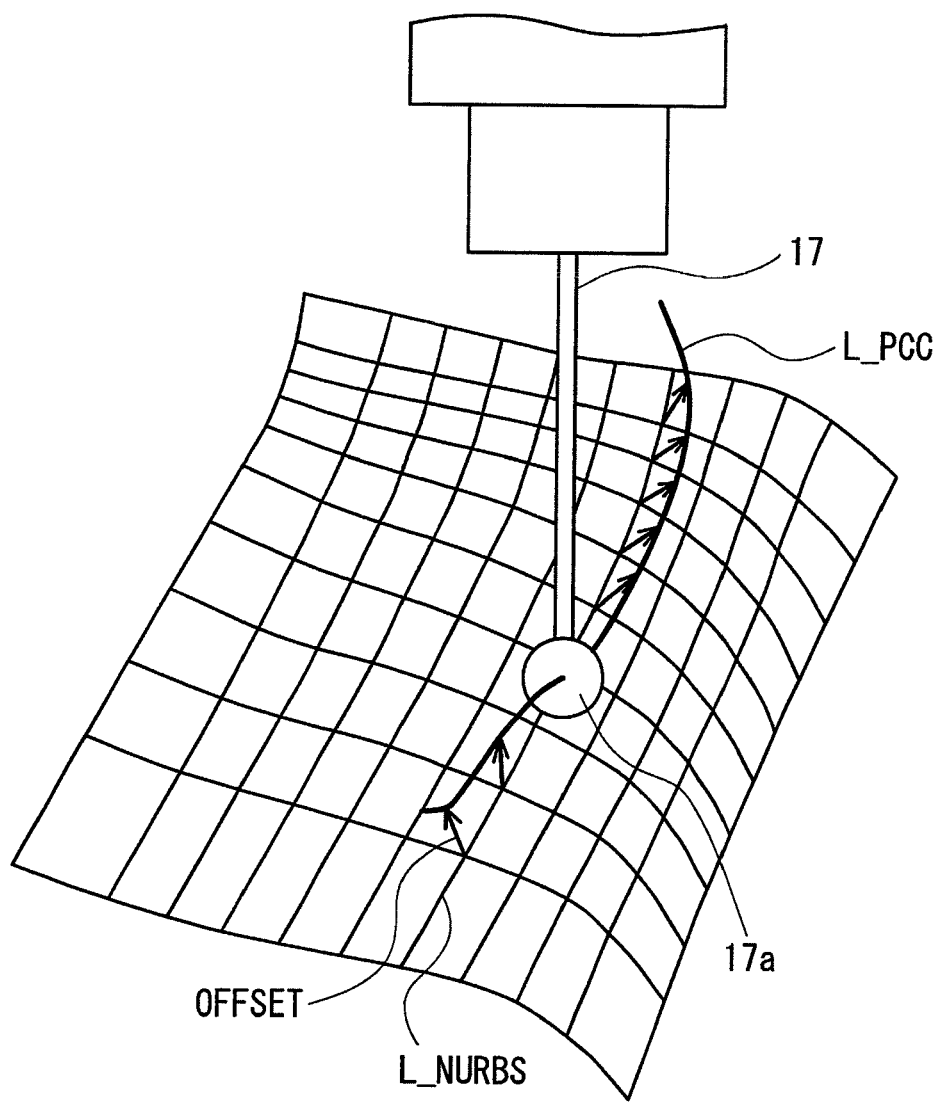
FIG. 3 is a diagram showing a relation between a NURBS (Non-Uniform Rational B-Spline) curve and the PCC (Parametric Cubic Curves) curve.

Here, the PCC curve will be described. FIG. 3 is a diagram showing a relation between a NURBS curve and the PCC curve. As shown in FIG. 3, by NURBS data having a parameter and a coordinate value of a control point, a shape of the workpiece 31 can be represented by the NURBS curve and a NURBS curved surface. Further, even for a straight line or a plane, representation is enabled by the NURBS data, so that the whole shape of the workpiece 31 can be collectively represented by the NURBS data. Consequently, path information about movement of the contact piece 17a (stylus tip 17a) including a curve, a circular arc and a straight line can be collectively represented by the NURBS data to generate the PCC curve based on this NURBS data. The PCC curve L_PCC used as the path information is a curve in which the NURBS curve L_NURBS is offset in the normal direction. Here, an offset amount OFFSET is a value in which a reference deflection is subtracted from a radius of the contact piece 17a (stylus tip 17a). The CPU 41 performs control so that the center of a sphere of the contact piece 17a (stylus tip 17a) passes on this PCC curve.

Figure 4:
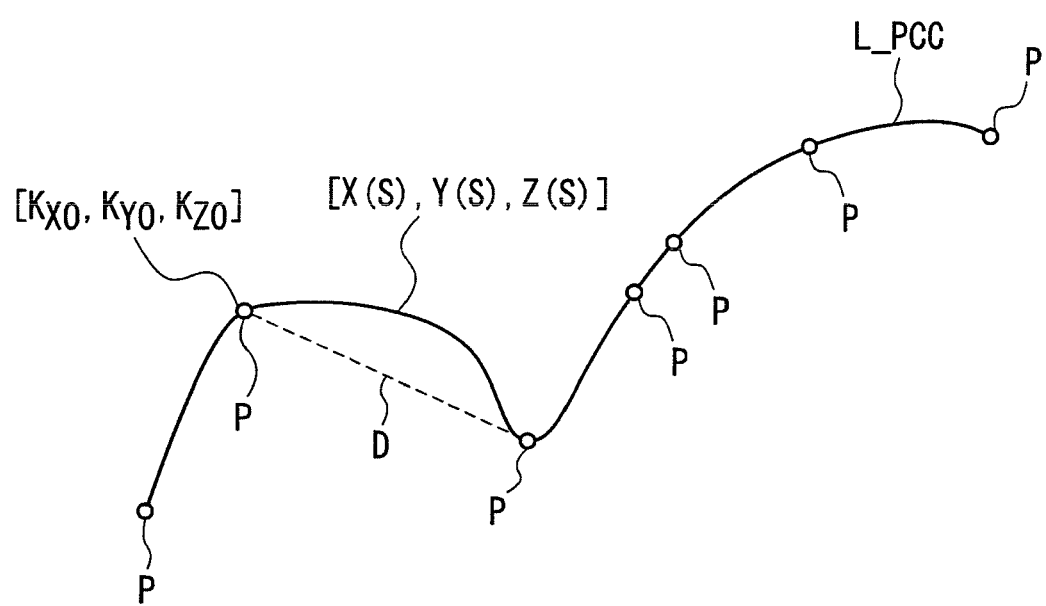
FIG. 4 is a diagram schematically showing a configuration of the PCC curve.

FIG. 4 is a diagram schematically showing a configuration of the PCC curve. As shown in FIG. 4, the PCC curve L_PCC is divided into plural segments by points P. Hence, each of the segments is also constructed of the PCC curve. An ending point of each of the segments results in a starting point of the next segment (PCC curve). Here, coordinates of a starting point of any PCC curve are set at ($K_{X0}$, $K_{Y0}$, $K_{Z0}$), and a length of a straight line between a starting point and an ending point in its PCC curve is set at D. In the case of being defined thus, coordinates {X(S), Y(S), Z(S)} in any position on the PCC curve are expressed by the following Formula (1).

[Mathematical Formula 1]

$$X(S)=K_{X1}S^3+K_{X2}S^2K_{X1}S+K_{X0}$$

$$Y(S)=K_{Y1}S^3+K_{Y2}S^2+K_{Y1}S+K_{Y0}$$

$$Z(S)=K_{Z1}S^3+K_{Z2}S^2+K_{Z1}S+K_{Z0}$$

$$S\textit{[0,D]} \quad (1)$$

Figure 5:
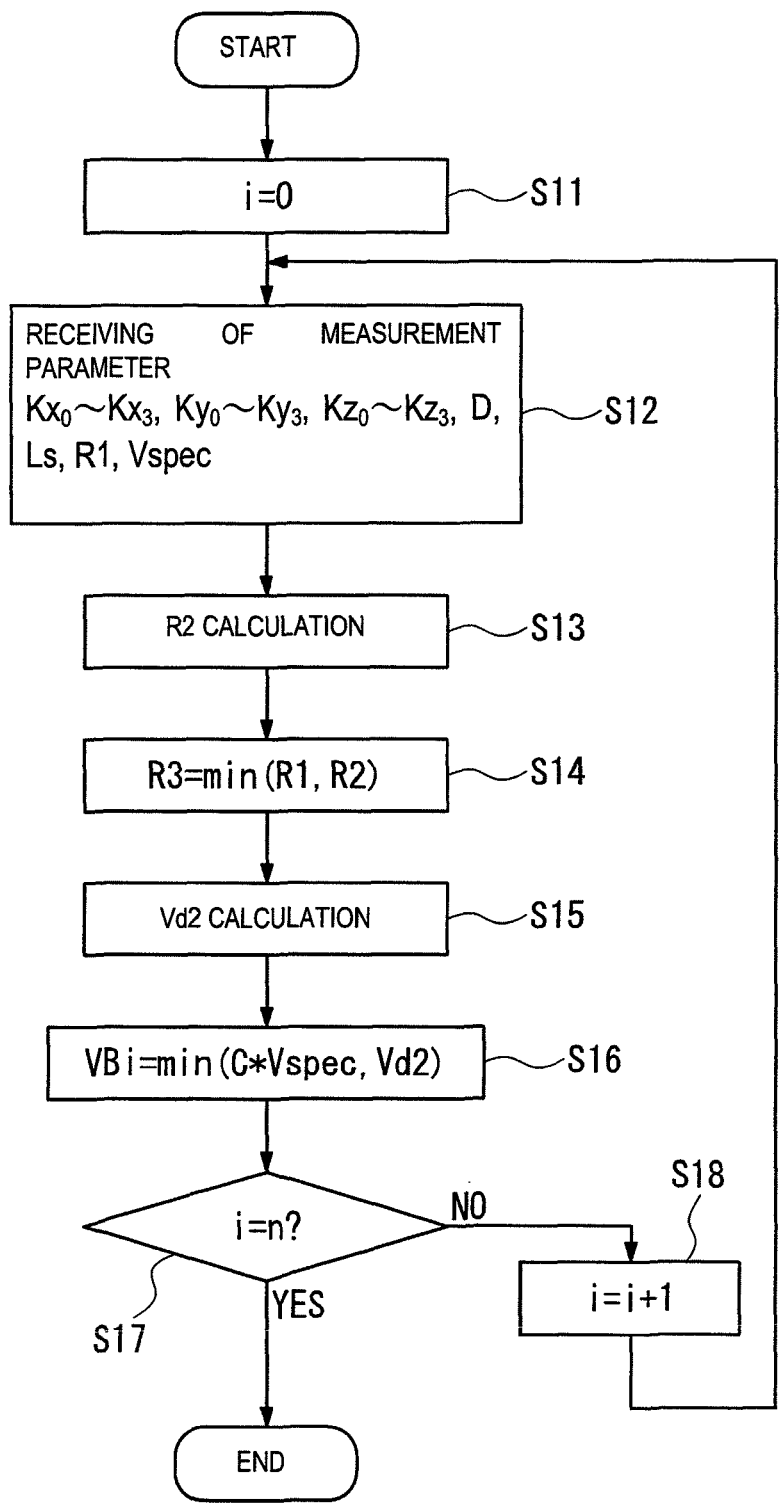
FIG. 5 is a flowchart showing a method of calculating a maximum speed in nominal scanning measurement of the shape measuring apparatus 100 according to the first embodiment.
Figure 6:
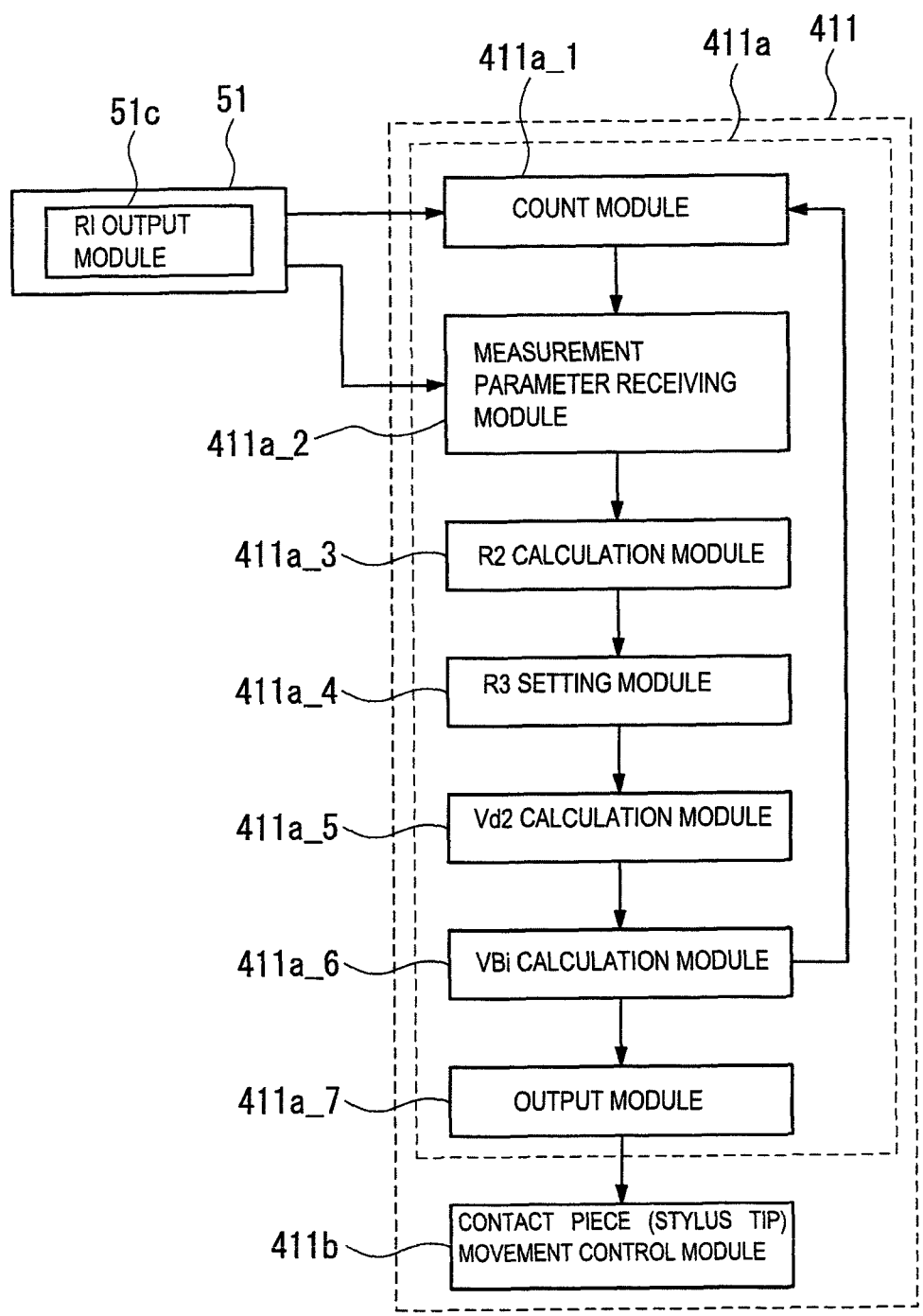

FIG. 5 is a flowchart showing a control method of nominal scanning measurement of the shape measuring apparatus 100 according to the first embodiment. This method calculates a maximum speed of probe movement in the nominal scanning measurement of the shape measuring apparatus 100. The maximum speed of the nominal scanning measurement is calculated by the movement speed calculation module 411a of the CPU 411 of the controller 41. FIG. 6 is a block diagram schematically showing a configuration of the movement speed calculation module 411a. A method for calculating a maximum speed of the ith segment (i is any integer more than or equal to 0 and less than or equal to n) from the starting point side of n segments (n is a positive integer) will hereinafter be described. First, a command from the CPU 51 is received, and a count module 411a_1 sets a value of i at "0" (step S11). Accordingly, the leading segment is specified as a measurement target segment.

Then, measurement parameters are given from the CPU 51 of the computer body 21 of the computer 2 to the CPU 411 of the controller 41 of the coordinate measuring machine 1 (step S12). Concretely, the measurement parameters created by the path information conversion module (RI conversion module) 51a and the path information division module (RI division module) 51b are outputted from the path information output module (RI output module) 51c to a measurement parameter receiving module 411a_2 of the movement speed calculation module 411a.

Here, the measurement parameters according to the present embodiment will be described in detail with reference to FIG. 4. D indicates a length (shortest distance) of a straight line ranging from a starting point and an ending point of a measurement target segment. In addition, the starting point of the measurement target segment matches with an ending point of the previous segment, and the ending point of the measurement target segment matches with a starting point of the next segment. $K_{X0}$ to $K_{X3}$, $K_{Y0}$ to $K_{Y3}$, $K_{Z0}$ to $K_{Z3}$ indicate coefficients of each of the coordinates of X, Y, Z, respectively. $K_{X0}$ to $K_{X3}$, $K_{Y0}$ to $K_{Y3}$, $K_{Z0}$ to $K_{Z3}$ and D are included in the measurement parameters given to the coordinate measuring machine 1 by the computer 2.

Also, the measurement parameters include an equivalent radius R1 (hereinafter also called a curvature radius R1. In addition, the curvature radius R1 corresponds to a first curvature radius), a curve length Ls of a segment, and a specified measurement speed Vspec. The curve length Ls indicates a length of a PCC curve connecting a starting point to an ending point of a measurement target segment. The curve length Ls can be obtained approximately, for example, by dividing the PCC curve connecting the starting point to the ending point of the measurement target segment into plural straight lines and calculating the sum of lengths of the respective straight lines.

The specified measurement speed Vspec represents a specified speed of shape measurement, inputted to the computer 2 through the keyboard 22 or the mouse 23 before the shape measurement. The shape measuring apparatus 100 moves the probe 17 at a speed which does not exceed the specified measurement speed Vspec, and makes the shape measurement.

Figure 7:
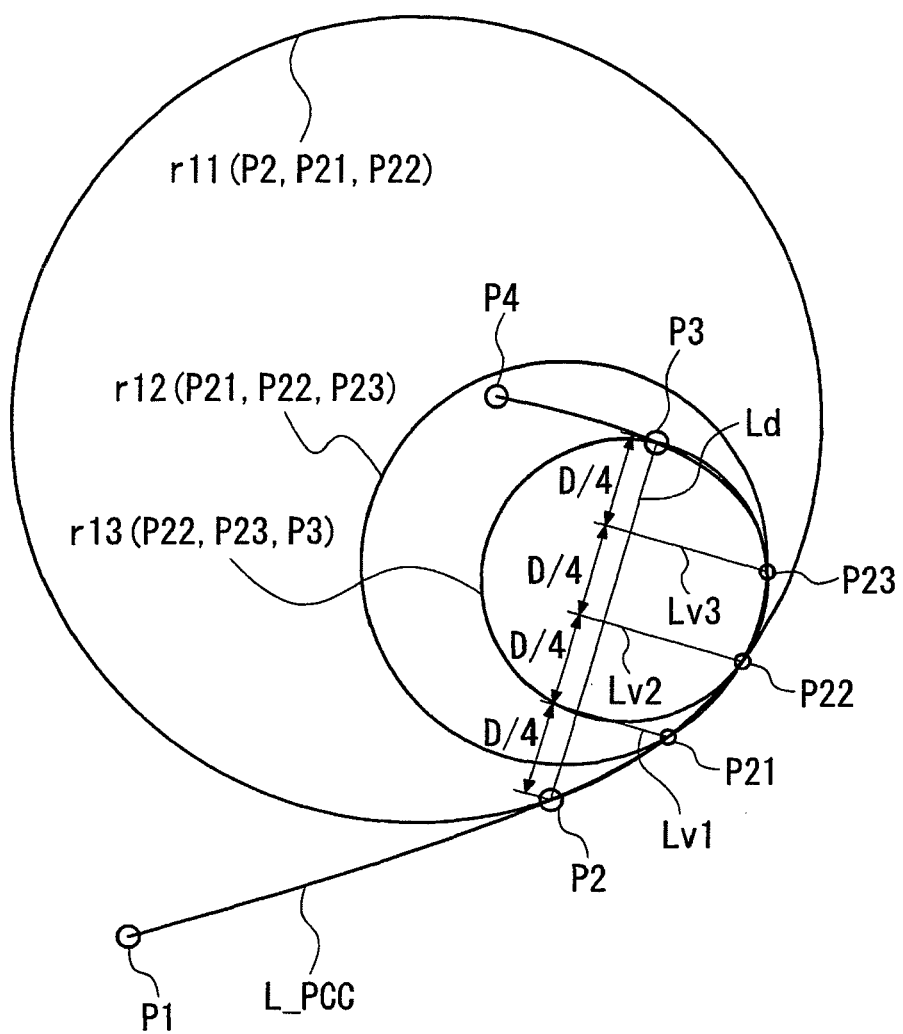
FIG. 7 is a diagram showing a method for calculating an equivalent radius R1.

The equivalent radius R1 is calculated by the path information division module (RI division module) 51b. A method for calculating the equivalent radius R1 will hereinafter be described concretely. FIG. 7 is a diagram showing the method for calculating the equivalent radius R1. Here, points P1 to P4 for dividing a PCC curve L_PCC are present, and a measurement target segment is set at a segment between a starting point P2 and an ending point P3. In order to obtain the equivalent radius R1, the PCC curve L_PCC between the starting point P2 and the ending point P3 is first divided into four equal parts. When the PCC curve L_PCC between the starting point P2 and the ending point P3 is divided into the four equal parts, for example, the starting point P2 is connected to the ending point P3 by a straight line Ld and a length D of the straight line is divided into four equal parts. Then, straight lines Lv1 to Lv3 orthogonal to the straight line Ld through division points of the straight line Ld divided into four equal parts are drawn. Then, points of intersection between the straight lines Lv1 to Lv3 and the PCC curve L_PCC between the starting point P2 and the ending point P3 are set at division points of the PCC curve L_PCC between the starting point P2 and the ending point P3. In FIG. 7, the division points of the PCC curve L_PCC between the starting point P2 and the ending point P3 divided into four equal parts are set at division points P21, P22 and P23 sequentially from the side of the starting point P2.

Then, circles drawn through three continuous points of the starting point P2, the division points P21, P22 and P23 and the ending point P3 are set. Concretely, the circle drawn through the starting point P2, the division points P21 and P22 is set at a circle r11. The circle drawn through the division points P21, P22 and P23 is set at a circle r12. The circle drawn through the division points P22 and P23 and the ending point P3 is set at a circle r13.

Then, radii R11, R12 and R13 of the circles r11, r12 and r13 are obtained. In an example shown in FIG. 7, R11>R12>R13 is obtained. In other words, a curvature of a curve formed by the starting point P2, the division points P21 and P22 is the smallest, and a curvature of a curve formed by the division points P22 and P23 and the ending point P3 is the largest.

Subsequently, the smallest radius of the radii R11, R12 and R13 is set at the equivalent radius R1. In this example, R13 is set as the equivalent radius R1. That is, it can be understood that a maximum curvature of the PCC curve constructing a target segment is estimated and a curvature radius corresponding to the maximum curvature is set as the equivalent radius R1.

Figures 8, 9:
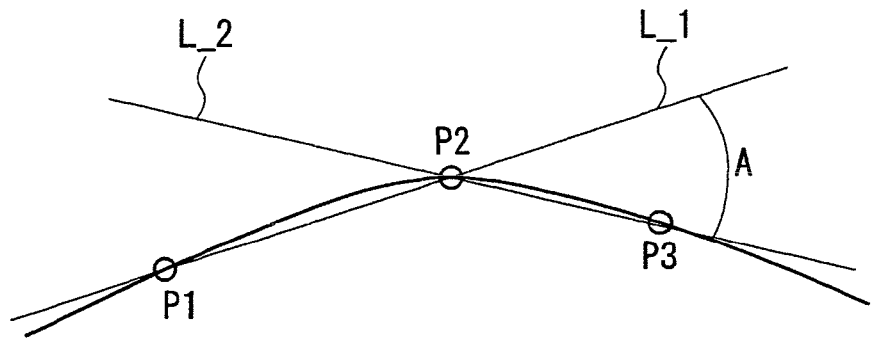
FIG. 8 is a diagram showing a relation between a measurement target segment and a segment next to the measurement target segment.
FIG. 9 is a diagram showing an example of the data dependence limiting speed table.

Returning to FIG. 5, the method for calculating the maximum speed of the nominal scanning measurement of the shape measuring apparatus 100 is described subsequently. After step S12, an equivalent radius calculation module (R2 calculation module of FIG. 6) 411a_3 of the movement speed calculation module 411a calculates an equivalent radius R2 (hereinafter also called a curvature radius R2. In addition, the curvature radius R2 corresponds to a second curvature radius) from an angle between adjacent segments (step S13). A method for calculating the equivalent radius R2 will hereinafter be described concretely. FIG. 8 is a diagram showing a relation between a measurement target segment and a segment next to the measurement target segment. First, a straight line L1 connecting a starting point P1 to an ending point P2 of the measurement target segment is drawn. Next, a straight line L2 connecting a starting point (that is, the ending point of the measurement target segment) P2 to an ending point P3 of the segment next to the measurement target segment is drawn. Then, an angle A between the straight line L1 and the straight line L2 is calculated. In addition, the angle A can be understood as a supplementary angle of an angle formed by two continuous segments (an angle joined between two continuous segments).

A data dependence limiting speed table is previously stored in the equivalent radius calculation module (R2 calculation module of FIG. 6) 411a_3 of the movement speed calculation module 411a. In the data dependence limiting speed table, a value of a data dependence limiting speed Vd1 is associated with the angle A. FIG. 9 is a diagram showing an example of the data dependence limiting speed table. In the case of 0°≤A<5°, the data dependence limiting speed Vd1 is not set, but in the range of 5°≤A<25°, the data dependence limiting speed Vd1 is set in increments of 5°. In the range of 25°≤A<45°, the data dependence limiting speed Vd1 is set in increments of 10°. In addition, in the range of 45°≤A<180°, the data dependence limiting speed Vd1 is not set and an error determination is made.

The equivalent radius R2 is decided by the following Formula (2).

[Mathematical Formula 2]

$$R2 = \frac{D}{100} Vd1 \quad \left(Vd1 > \frac{100C}{D}\right) \qquad (2)$$

$$R2 = \frac{D^2}{100000 C} Vd1^2 \quad \left(Vd1 \le \frac{100C}{D}\right)$$

However, C and D are predetermined values, and are previously stored in, for example, the equivalent radius calculation module 411a_3. The equivalent radius calculation module 411a_3 properly refers to the values of C and D, and determines the size of the data dependence limiting speed Vd1, and calculates the equivalent radius R2 using Formula (2).

Returning to FIG. 5, the control method of the nominal scanning measurement of the shape measuring apparatus 100 is described subsequently. After step S13, an effective radius setting module (R3 setting module of FIG. 6) 411a_4 of the movement speed calculation module 411a selects a smaller value from among the equivalent radii R1 and R2, and sets the smaller value as an effective radius R3 (step S14).

Figure 10:
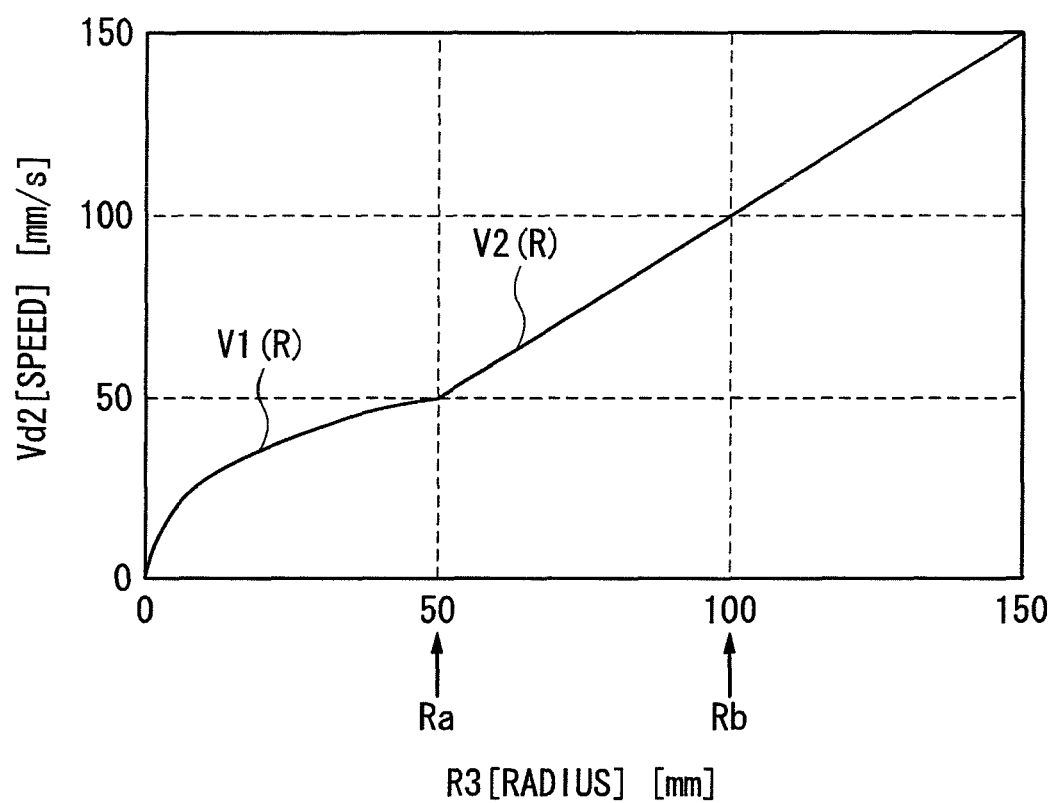
FIG. 10 is a graph showing a limiting speed curve stored in a limiting speed calculation module 411a_5.

A limiting speed curve is previously stored in a limiting speed calculation module (Vd2 calculation module of FIG. 6) 411a_5 of the movement speed calculation module 411a. FIG. 10 is a graph showing the limiting speed curve stored in the limiting speed calculation module 411a_5. In FIG. 10, a radius 50 mm=Ra and a radius 100 mm=Rb are set. At this time, limiting speed curves V1 and V2 are given by the following Formulas (3) and (4).

[Mathematical Formula 3]

$$Vd2 = V1 = \frac{100\sqrt{R3 \cdot Ra}}{Rb} \quad (0 < R3 \le Ra) \qquad (3)$$

[Mathematical Formula 4]

$$Vd2 = V2 = \frac{100 \cdot R3}{Rb} \quad (Ra < R3) \qquad (4)$$

The Vd2 calculation module 411a_5 of the movement speed calculation module 411a refers to a limiting speed table, and obtains a limiting speed Vd2 corresponding to a value of the effective radius R3 (step S15).

Thereafter, a maximum speed calculation module (VBi calculation module of FIG. 6) 411a_6 of the movement speed calculation module 411a sets a smaller speed of the limiting speed Vd2 and a value in which the specified measurement speed Vspec is multiplied by a coefficient C (C is any positive value) as a maximum speed VBi of shape measurement of the ith segment (step S16). In addition, the coefficient C is called an override volume, and the specified measurement speed Vspec is multiplied for the safety of measurement. That is, by obtaining 0<C<1, the probe 17 can surely be prevented from being moved at a speed higher than or equal to the specified measurement speed Vspec during shape measurement.

Thereafter, the count module 411a_1 of the movement speed calculation module 411a checks whether or not i=n is satisfied (step S17). When i<n is satisfied, the count module 411a_1 of the movement speed calculation module 411a adds "1" to i (step S18), and returns the processing to step S12. That is, the maximum speeds VB1 to VBn of all the segments can be obtained by repeating the processing of steps S12 to S18.

When i=n is satisfied, the maximum speed calculation module (VBi calculation module of FIG. 6) 411a_6 of the movement speed calculation module 411a outputs information indicating the calculated maximum speeds VB1 to VBn to an output module 411a_7. The output module 411a_7 outputs the information indicating the maximum speeds VB1 to VBn to the contact piece (stylus tip) movement control module 411b.

As described above, the coordinate measuring machine 1 makes shape measurement along a PCC curve at a speed lower than the maximum speeds VB1 to VBn in each segment. Accordingly, scanning measurement can properly be made at a speed lower than or equal to the specified measurement speed and a limiting speed determined by shape.

In addition, since the equivalent radius R1 is calculated for a measurement target segment, even when the measurement target segment has the portion with a large curvature, the maximum speed VBi can be decreased sufficiently.

Consequently, the coordinate measuring machine 1 can well scan the portion with a large curvature in the measurement target segment.

Also, the equivalent radius R2 is calculated based on an angle between a measurement target segment and a segment next to the measurement target segment. Hence, even in the case of having a large curvature at a point of connection between the measurement target segments, the maximum speed VBi can be decreased sufficiently. Consequently, even in the case of having the large curvature at the point of connection between the measurement target segments, the coordinate measuring machine 1 can well scan the point of connection.

As described above, shape measurement by a movement path made of the PCC curve can be made by moving the probe 17 at the calculated maximum speed VBi or lower in each segment. In addition, in order to reduce the time necessary to make the shape measurement, a movement speed is preferably set at the largest possible value in the range of a low speed lower than or equal to the maximum speed VBi.

In addition, Patent Reference 2 discloses that measurement parameters such as a movement speed in each section ranging from a starting point to an ending point of a movement path are calculated backward from the ending point of the movement path in nominal scanning measurement. In this case, the nominal scanning measurement of a shape measuring apparatus cannot be started until calculation of the measurement parameters such as the movement speed is completed after an initial parameter of measurement is inputted. As a result, a problem that the time necessary to make the nominal scanning measurement of the shape measuring apparatus is long occurs.

On the other hand, according to the present embodiment, the maximum speed VBi can be calculated sequentially from a segment of the starting point side of the PCC curve. Hence, by sequentially outputting the calculated maximum speed VBi, shape measurement can also be started without waiting the completion of calculation of the maximum speeds VBi of all the segments. Hence, according to the present embodiment, the time necessary to make the nominal scanning measurement of the shape measuring apparatus can be reduced.

Second Embodiment

Figure 11:
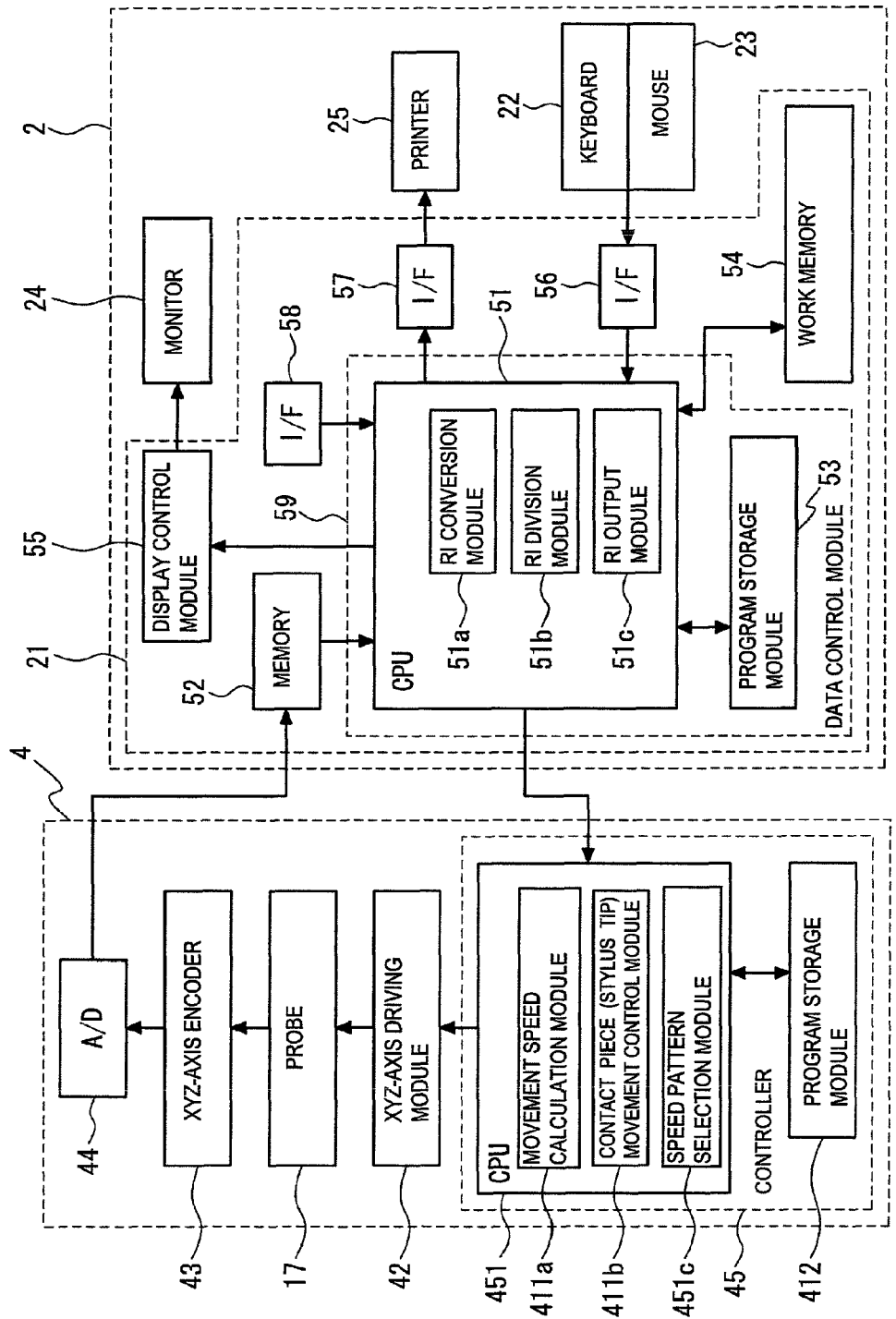
FIG. 11 is a block diagram schematically showing a configuration of a shape measuring apparatus 200 according to a second embodiment.

Next, a shape measuring apparatus 200 according to a second embodiment will be described. The shape measuring apparatus 200 is a modified example of the shape measuring apparatus 100 according to the first embodiment, and has a function of deciding a speed pattern conforming to a PCC curve based on a maximum speed VBi. FIG. 11 is a block diagram schematically showing a configuration of the shape measuring apparatus 200 according to the second embodiment. A controller 45 and a CPU 451 of a coordinate measuring machine 4 correspond to the controller 41 and the CPU 411, respectively. The CPU 451 has a movement speed calculation module 411a, a contact piece (stylus tip) movement control module 411b and a speed pattern selection module 451c. Since a configuration of the coordinate measuring machine 4 other than the speed pattern selection module 451c is similar to that of the coordinate measuring machine 1, description is omitted.

Generally, three states of acceleration (positive acceleration), deceleration (negative acceleration) and a constant speed (acceleration is 0) are present in the case of controlling a speed. In the present embodiment, using the three states, changes in speed in one segment are represented by nine patterns. FIG. 12 is a diagram showing patterns of changes in speed in one segment. In FIG. 12, an initial speed is displayed as VSi and a terminal speed is displayed as VFi. Also, a maximum reach speed is displayed as VUi. In addition, a maximum speed in a segment is displayed as Vmax.

Figure 13:
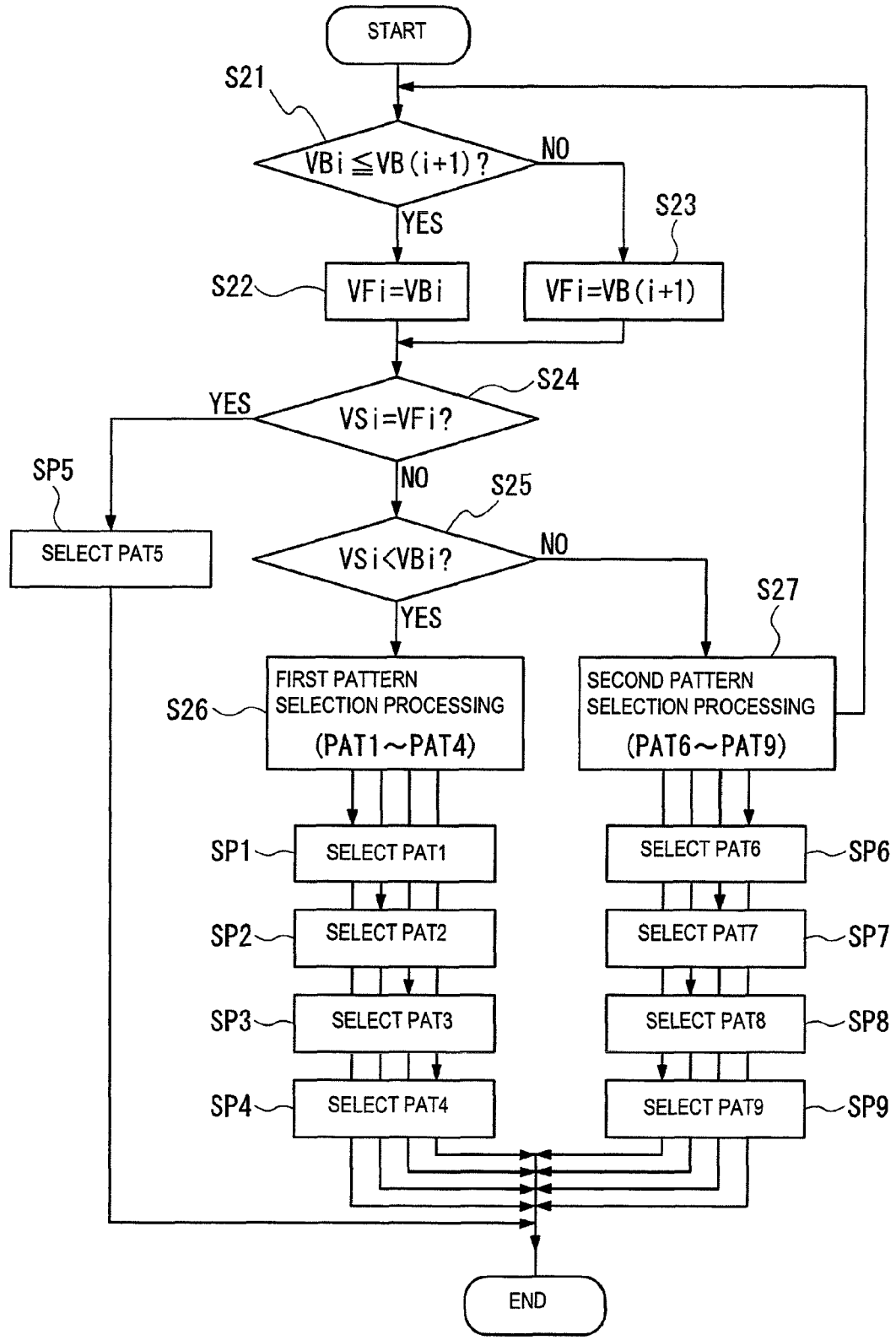
FIG. 13 is a flowchart showing a speed pattern selection method according to the second embodiment.

FIG. 13 is a flowchart showing a speed pattern selection method according to the second embodiment. The speed pattern selection module 451c first compares a maximum speed VBi of a measurement target segment with a maximum speed VB(i+1) of a segment next to the measurement target segment (step S21). Then, in the case of VBi≤VB(i+1), the speed pattern selection module 451c sets a terminal speed VFi of the measurement target segment at VBi (step S22). In the case of VBi>VB(i+1), the speed pattern selection module 451c sets the terminal speed VFi of the measurement target segment at VB(i+1) (step S23). Accordingly, the terminal speed VFi of the measurement target segment can surely be prevented from exceeding the maximum speed VB(i+1) of the segment next to the measurement target segment.

Subsequently, the speed pattern selection module 451c determines whether or not an initial speed VSi of the measurement target segment is equal to the terminal speed VFi (step S24). In the case of VSi=VFi, the speed pattern selection module 451c selects a pattern 5 (PAT5) of a constant speed as a speed pattern allocated to the measurement target segment (step SP5). In addition, movement time t2 of a constant speed movement region is t2=Li/VSi.

In the case of VSi≠VFi, the speed pattern selection module 451c determines a magnitude relation between the initial speed VSi and the terminal speed VFi of the measurement target segment (step S25). The speed pattern selection module 451c proceeds to first pattern selection processing (step S26) in the case of VSi<VFi, and proceeds to second pattern selection processing (step S27) in the case of VSi>VFi. The first pattern selection processing (step S26) is processing for selecting a speed pattern allocated to the measurement target segment from speed patterns 1 to 4 (steps SP1 to SP4) corresponding to the case of VSi<VFi. The second pattern selection processing (step S27) is processing for selecting a speed pattern allocated to the measurement target segment from speed patterns 6 to 9 (steps SP6 to SP9) corresponding to the case of VSi>VFi. However, depending on a result of condition branch processing of the second pattern selection processing (step S27), processing returning to step S21 is performed. The processing returning to step S21 will be described below.

Figure 14:
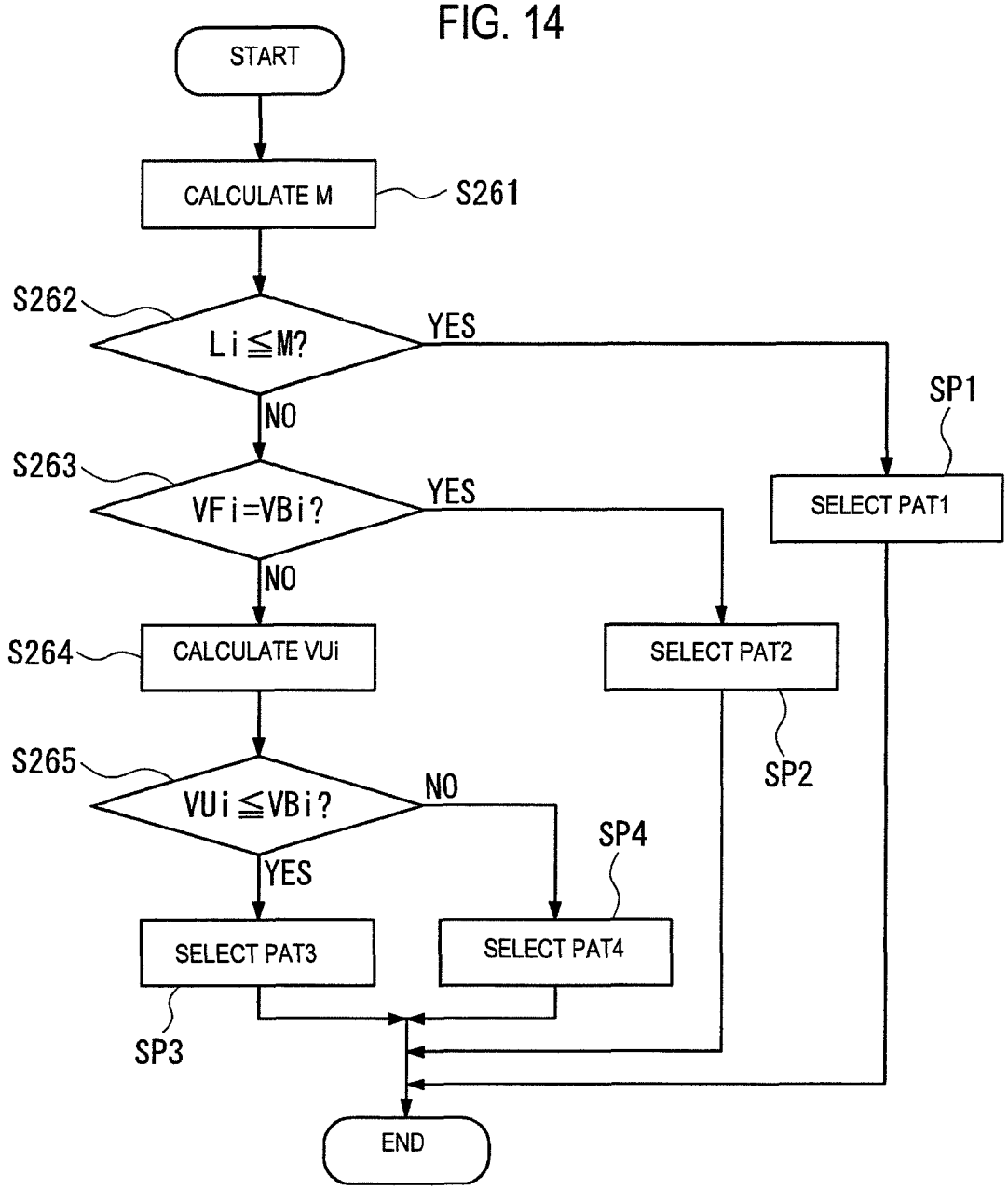
FIG. 14 is a flowchart showing a processing in a first pattern selection processing (step S26).

FIG. 14 is a flowchart showing the processing in the first pattern selection processing (step S26). Hereinafter, acceleration of probe movement of the coordinate measuring machine 4 is set at α. First, the speed pattern selection module 451c calculates a movement distance M in the case of accelerating with acceleration α from the initial speed VSi to the terminal speed VFi of the measurement target segment (step S261). When the time necessary for acceleration from the initial speed VSi to the terminal speed VFi is set at $t_M$, the terminal speed VFi and the movement distance M are expressed by the following Formulas (5) and (6).

[Mathematical Formula 5]

$$VFi = \alpha \cdot t_M + VSi \quad (5)$$

[Mathematical Formula 6]

$$M = \frac{1}{2}\alpha \cdot t_M^2 + VSi \cdot t_M \quad (6)$$

When $t_M$ is eliminated using Formulas (5) and (6), the movement distance M is expressed by the following Formula (7).

[Mathematical Formula 7]

$$M = \frac{1}{2\alpha}(VFi^2 - VSi^2) \quad (7)$$

The speed pattern selection module 451c compares the movement distance M with a segment length Li (step S262). In the case of Li≤M, the terminal speed VFi is reached at an ending point of a segment by accelerating with the acceleration α. Hence, the speed pattern selection module 451c selects a pattern 1 (PAT1) (step SP1). In addition, movement time t1 of an acceleration region is t1=(VFi−VSi)/α.

In the case of Li>M, this means that the ending point of the segment is not reached only for a section accelerating with the acceleration α. In this case, the ending point of the segment is reached by performing acceleration, deceleration and constant speed movements after moving by the movement distance M. In order to decide an aspect of movement after moving by the movement distance M, the terminal speed VFi is compared with the maximum speed VBi (step S263).

In the case of VFi=VBi, after moving by the movement distance M, acceleration cannot be made, so that constant speed movement is performed to the ending point of the segment at the terminal speed VFi. Hence, in the case of VFi=VBi, the speed pattern selection module 451c selects a pattern 2 (PAT2) (step SP2). In addition, movement time t1 of the acceleration region is t1=(VFi−VSi)/α. Movement time t2 of the constant speed movement region is t2={Li−t1(VFi+VSi)/2}/VFi.

In the case of VFi≠VBi, that is, the case of setting the terminal speed VFi at VB(i+1), the case where after moving by the movement distance M, by exceeding the terminal speed VFi and accelerating with acceleration α and thereafter decelerating with acceleration −α, the terminal speed VFi is reached while moving the segment distance Li can be assumed. The speed pattern selection module 451c calculates a maximum reach speed VUi (>VFi) at this time (step S264).

Figure 15:
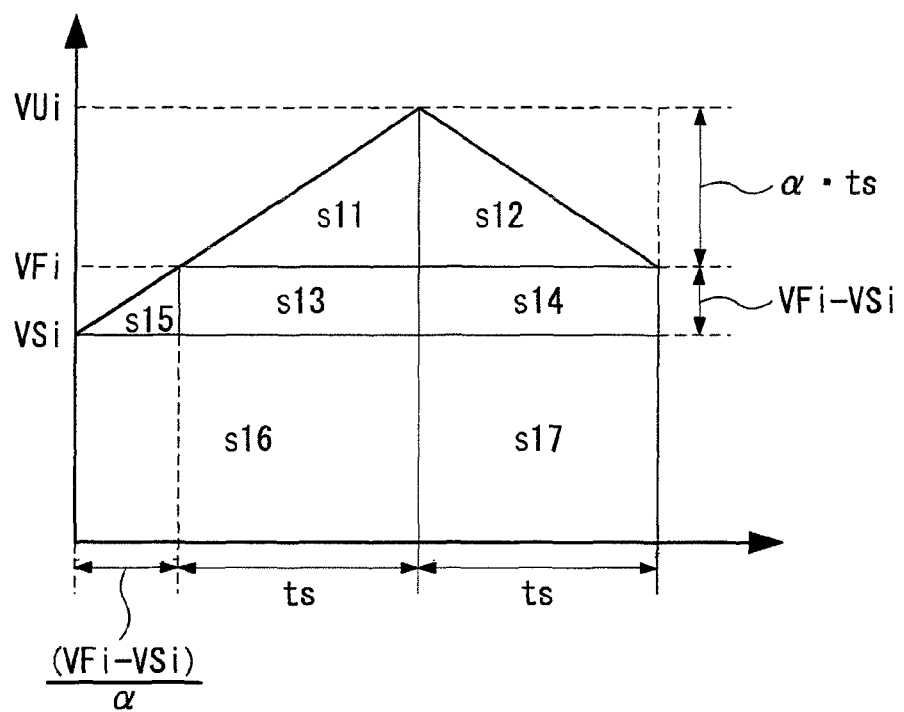
FIG. 15 is a diagram showing a method for calculating a maximum reach speed from a speed pattern in step S264.

FIG. 15 is a diagram showing a method for calculating the maximum reach speed from a speed pattern in step S264. FIG. 15 shows an example of sequentially making acceleration and deceleration with acceleration α simply in the case of VSi<VFi. First, a movement distance shown in FIG. 15 is computed. Concretely, an area S of the portion formed by a function showing a speed is computed. The area S includes areas s11 to s17 as shown in FIG. 15. The areas s11 to s17 are respectively expressed by the following Formula (8).

[Mathematical Formula 8]

$$s11 = s12 = \frac{\alpha \cdot ts \cdot ts}{2} = \frac{\alpha \cdot ts^2}{2} \quad (8)$$
$$s13 = s14 = ts(VFi - VSi)$$
$$s15 = \frac{1}{2}\frac{(VFi-VSi)}{\alpha} \cdot (VFi-VSi) = \frac{(VFi-VSi)^2}{2\alpha}$$
$$s16 = \left\{\frac{(VFi-VSi)}{\alpha} + ts\right\} \cdot VSi$$
$$s17 = ts \cdot VSi$$

The area S can be expressed by the following Formula (9) from Formula (8).

[Mathematical Formula 9]

$$S = \sum_{k=11}^{17} Sk = \quad (9)$$
$$\alpha \cdot ts^2 + 2ts(VFi-VSi) + \frac{(VFi-VSi)^2}{2\alpha} + \left\{2ts + \frac{(VFi-VSi)}{\alpha}\right\}VSi$$

When Formula (9) is rewritten into a quadratic equation of ts, the following Formula (10) is obtained.

[Mathematical Formula 10]

$$\alpha \cdot ts^2 + 2ts \cdot VFi + \frac{(VFi-VSi)^2}{2\alpha} + \quad (10)$$
$$\left\{\frac{(VFi-VSi)^2}{2\alpha} + \frac{VSi(VFi-VSi)}{\alpha} - S\right\} = 0$$

When Formula (10) is solved for ts, the following Formula (11) is obtained.

[Mathematical Formula 11]

$$ts = \frac{-VFi \pm \sqrt{\frac{(VSi^2 + VFi^2)}{2} + \alpha S}}{\alpha} \quad (11)$$

Since the inside of a root of the right side equivalent to a discriminant of Formula (10) in Formula (11) becomes a positive value, Formula (11) has a solution of a real number. A plus solution is obtained, and ts can be decided as shown in Formula (12).

[Mathematical Formula 12]

$$ts = \frac{-VFi + \sqrt{\frac{(VSi^2 + VFi^2)}{2} + \alpha S}}{\alpha} \quad (12)$$

Also, the maximum reach speed VUi is expressed by the following Formula (13).

[Mathematical Formula 13]

$$VUi = VFi + \alpha \cdot ts \quad (13)$$

By substituting Formula (12) into Formula (13), the maximum reach speed VUi is expressed by the following Formula (14).

[Mathematical Formula 14]

$$VUi = \sqrt{\frac{(VSi^2 + VFi^2)}{2} + \alpha S} \quad (14)$$

The speed pattern selection module 451c compares the maximum reach speed VUi with the maximum speed VBi (step S265). In the case of VUi≤VBi, an acceleration region and a deceleration region can be present continuously, so that the speed pattern selection module 451c selects a pattern 3 (PAT3) (step SP3). In addition, movement time t3 of the deceleration region is t3=(-VFi+VUi)/α. Movement time t1 of the acceleration region is t1=t3+(VFi-VSi)/α.

In the case of VUi>VBi, a region of constant speed movement at the maximum speed VBi is generated between the acceleration region and the deceleration region. In this case, the speed pattern selection module 451c selects a pattern 4 (PAT4) constructed of the acceleration region, a constant speed region and the deceleration region (step SP4). In addition, movement time t1 of the acceleration region is t1=(VBi-VSi)/α. Movement time t2 of the constant speed movement region is t2=Li/VBi-{(VBi-VSi)²+ (VBi-VFi)²}/(2α·VBi). Movement time t3 of the deceleration region is t3=(-VFi+VBi)/α.

Figure 16:
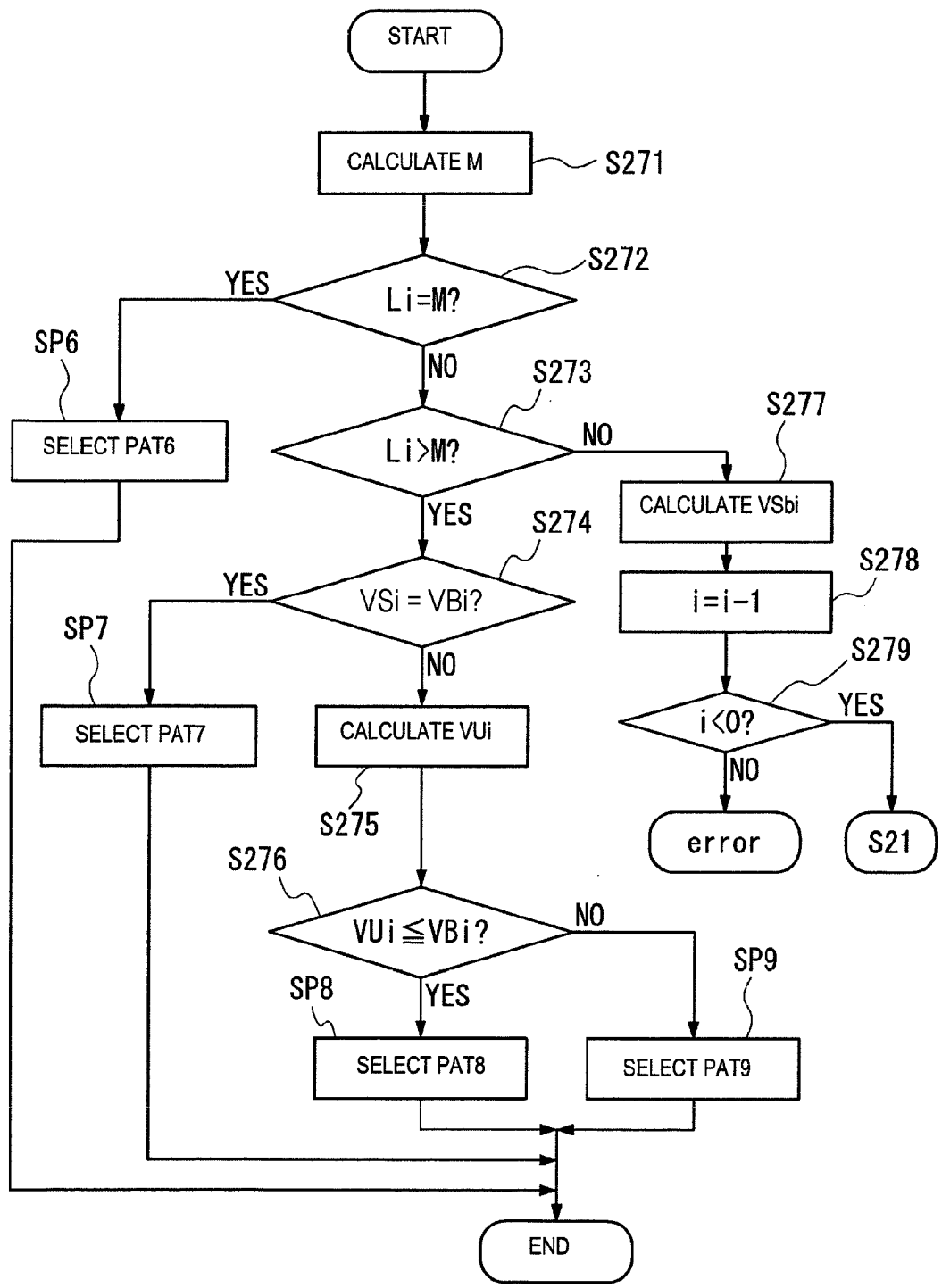
FIG. 16 is a flowchart showing a processing in a second pattern selection processing (step S27).

FIG. 16 is a flowchart showing the processing in the second pattern selection processing (step S27). First, the speed pattern selection module 451c calculates a movement distance M in the case of decelerating with acceleration -α from the initial speed VSi to the terminal speed VFi of the measurement target segment (step S271). When the time necessary for deceleration from the initial speed VSi to the terminal speed VFi is set at $t_M$, the terminal speed VFi and the movement distance M are expressed by the following Formulas (15) and (16).

[Mathematical Formula 15]

$$VFi = -\alpha \cdot t_M + VSi \quad (15)$$

[Mathematical Formula 16]

$$M = -\frac{1}{2}\alpha \cdot t_M^2 - VSi \cdot t_M \quad (16)$$

When $t_M$ is eliminated using Formulas (15) and (16), the movement distance M is expressed by the following Formula (17).

[Mathematical Formula 17]

$$M = \frac{1}{2\alpha}(VSi^2 - VFi^2) \quad (17)$$

The speed pattern selection module 451c compares the movement distance M with a segment length Li (step S272). In the case of Li=M, the terminal speed VFi is reached at an ending point of a segment by decelerating with the acceleration -α. Hence, the speed pattern selection module 451c selects a pattern 6 (PAT6) (step SP6). In addition, movement time t3 of a deceleration region is t3=(VSi-VFi)/α.

In a case where Li≠M, the speed pattern selection module 451c compares the movement distance M with the segment length Li (step S273). In the case of Li>M, this means that the ending point of the segment is not reached only for a section decelerating with the acceleration -α. In this case, the ending point of the segment is reached by performing acceleration, deceleration and constant speed movements in addition to movement by the movement distance M. In addition, in order to minimize the movement time, an acceleration region and a constant speed region are formed before the deceleration region (patterns 7 to 9). In order to decide an aspect of movement different from the case of moving by the movement distance M, the speed pattern selection module 451c compares the initial speed VSi with the maximum speed VBi (step S274).

In the case of VSi=VBi, before the deceleration region of the movement distance M, acceleration cannot be made, so that constant speed movement is performed from a starting point of the segment to a starting point of the deceleration region at the terminal speed VSi. Hence, in the case of VSi=VBi, the speed pattern selection module 451c selects a pattern 7 (PAT7) (step SP7). In addition, movement time t3 of the deceleration region is t3=(VSi-VFi)/α. Movement time t2 of the constant speed movement region is t2={Li-t3(VFi+VSi)/2}/VSi.

In the case of VSi≠VBi, that is, the case of setting the terminal speed VFi at VB(i+1), to the starting point of the deceleration region, the initial speed VSi is exceeded and acceleration is made with acceleration α and thereafter deceleration is made with acceleration -α. Then, when deceleration is made to the initial speed VSi, the case where while decelerating with acceleration -α subsequently, the movement distance M is moved and the terminal speed VFi is reached can be assumed. The speed pattern selection module 451c calculates a maximum reach speed VUi (>VFi) at this time (step S275).

Figure 17:
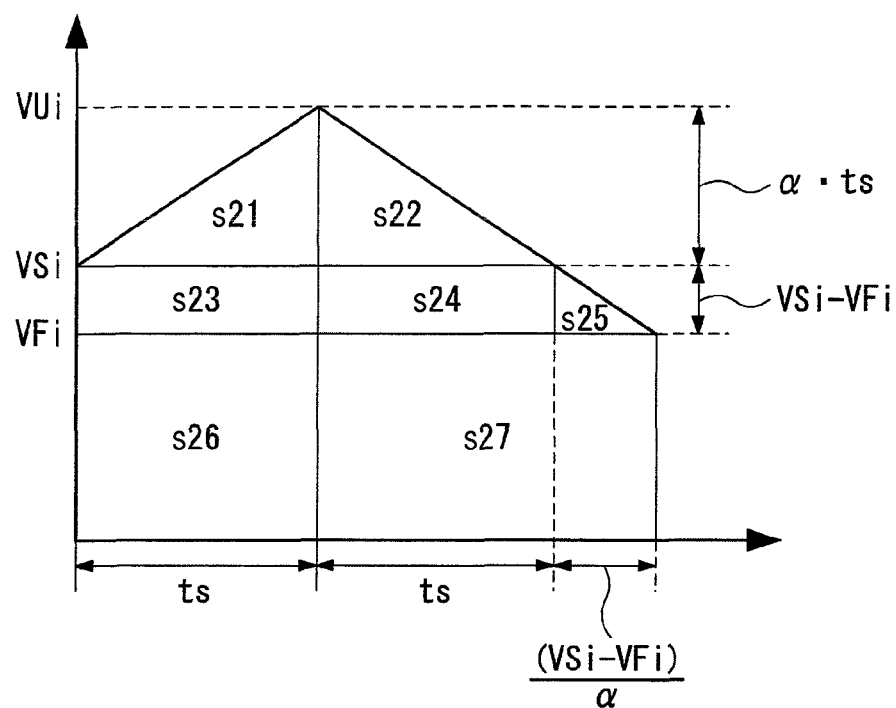
FIG. 17 is a diagram showing a method for calculating a maximum reach speed from a speed pattern in step S275.

FIG. 17 is a diagram showing a method for calculating the maximum reach speed from a speed pattern in step S275. FIG. 15 shows an example of sequentially making acceleration and deceleration with acceleration α simply in the case of VSi>VFi. First, a movement distance shown in FIG. 17 is computed. Concretely, an area S of the portion formed by a function showing a speed is computed. The area S includes areas s21 to s27 as shown in FIG. 17. The areas s21 to s27 are respectively expressed by the following Formula (18).

[Mathematical Formula 18]

$$s21 = s22 = \frac{\alpha \cdot ts \cdot ts}{2} = \frac{\alpha \cdot ts^2}{2} \quad (18)$$
$$s23 = s24 = ts(VSi - VFi)$$
$$s25 = \frac{1}{2}\frac{(VSi - VFi)}{\alpha} \cdot (VSi - VFi) = \frac{(VSi - VFi)^2}{2\alpha}$$
$$s26 = ts \cdot VFi$$
$$s27 = \left\{\frac{(VSi - VFi)}{\alpha} + ts\right\} \cdot VFi$$

The area S can be expressed by the following Formula (19) from Formula (18).

[Mathematical Formula 19]

$$S = \sum_{k=21}^{27} Sk = \quad (19)$$
$$\alpha \cdot ts^2 + 2ts(VSi - VFi) + \frac{(VSi - VFi)^2}{2\alpha} + \left\{2ts + \frac{(VSi - VFi)}{\alpha}\right\}VFi$$

When Formula (19) is rewritten into a quadratic equation of ts, the following Formula (20) is obtained.

[Mathematical Formula 20]

$$\alpha \cdot ts^2 + 2ts \cdot VSi + \frac{(VSi - VFi)^2}{2\alpha} + \left\{ \frac{(VSi - VFi)^2}{2\alpha} + \frac{VFi(VSi - VFi)}{\alpha} - S \right\} = 0 \quad (20)$$

When Formula (20) is solved for ts, the following Formula (21) is obtained.

[Mathematical Formula 21]

$$ts = \frac{-VSi \pm \sqrt{\frac{(VSi^2 + VFi^2)}{2} + \alpha S}}{\alpha} \quad (21)$$

Since the inside of a root of the right side equivalent to a discriminant of Formula (20) in Formula (21) becomes a positive value, Formula (21) has a solution of a real number. A plus solution is obtained, and ts can be decided as shown in Formula (22).

[Mathematical Formula 22]

$$ts = \frac{-VSi + \sqrt{\frac{(VSi^2 + VFi^2)}{2} + \alpha S}}{\alpha} \quad (22)$$

Also, the maximum reach speed VUi is expressed by the following Formula (23).

[Mathematical Formula 23]

$$VUi = VSi + \alpha \cdot ts \quad (23)$$

By substituting Formula (22) into Formula (23), the maximum reach speed VUi is expressed by the following Formula (24).

[Mathematical Formula 24]

$$VUi = \sqrt{\frac{(VSi^2 + VFi^2)}{2} + \alpha S} \quad (24)$$

The speed pattern selection module 451*c* compares the maximum reach speed VUi with the maximum speed VBi (step S276). In the case of VUi≤VBi, an acceleration region and a deceleration region can be present continuously, so that the speed pattern selection module 451*c* selects a pattern 8 (PAT8) (step SP8). In addition, movement time t1 of the acceleration region is t1=(−VSi+VUi)/α. Movement time t3 of the deceleration region is t3=t1(−VFi+VSi)/α.

In the case of VUi>VBi, a region of constant speed movement at the maximum speed VBi is generated between the acceleration region and the deceleration region. In this case, the speed pattern selection module 451*c* selects a pattern 9 (PAT9) constructed of the acceleration region, a constant speed region and the deceleration region (step SP9). In addition, movement time t1 of the acceleration region is t1=(VBi−VSi)/α. Movement time t2 of the constant speed movement region is t2=Li/VBi−{(VBi−VSi)²+(VBi−VFi)²}/(2α·VBi). Movement time t3 of the deceleration region is t3=(−VFi+VBi)/α.

In addition, in the case of Li<M, even when deceleration is made with acceleration −α, an ending point of a segment is reached before the terminal speed VFi is reached. That is, this case means that the initial speed VSi is excessive. In this case, it is necessary to reset the speed VSi. In this case, the speed pattern selection module 451*c* first obtains a settable initial speed VSbi (step S277). The settable initial speed VSbi is expressed by the following Formula (25).

[Mathematical Formula 25]

$$VSbi = \sqrt{2\alpha \cdot Li + VFi^2} \quad (25)$$

Then, the speed pattern selection module 451*c* sets a value of i at i=i−1 (step S278). Thereafter, the value of i is checked (step S279). In the case of i≥0 the flowchart returns to step S21 of FIG. 13, and the selection processing of the speed pattern is again executed. In the case of i<0, the speed pattern selection processing cannot be executed and an error is returned.

Figure 18:
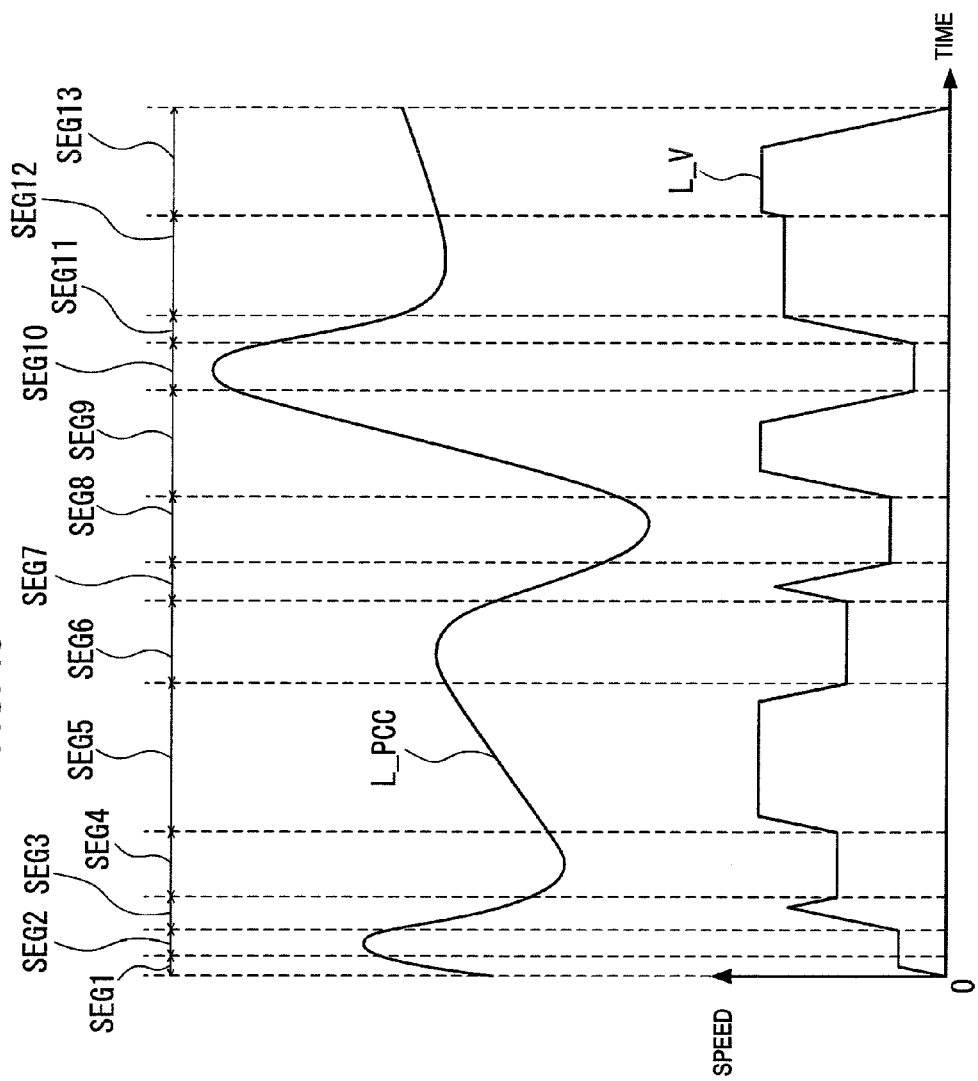
FIG. 18 is a diagram showing an example of a movement path and a speed pattern.

FIG. 18 is a diagram showing an example of a movement path and a speed pattern. As shown in FIG. 18, the speed patterns corresponding to a PCC curve L_PCC can be allocated to segments SEG1 to SEG13.

Third Embodiment

Next, a shape measuring apparatus 300 according to a third embodiment will be described. The shape measuring apparatus 300 is a modified example of the shape measuring apparatus 100 according to the first embodiment, and can more speed up shape measuring operation. In addition, since a configuration of the shape measuring apparatus 300 is similar to that of the shape measuring apparatus 100, description is omitted.

As described in the first embodiment, the PCC curve indicating the movement path is divided into plural segments. However, the segments with the same or approximate effective radius R may be continuously arranged. In this case, the segments with the same or approximate effective radius R also have the same or approximate maximum speed VBi. Consequently, the segments with the same or approximate effective radius R3 could be treated as one block.

Figure 19:
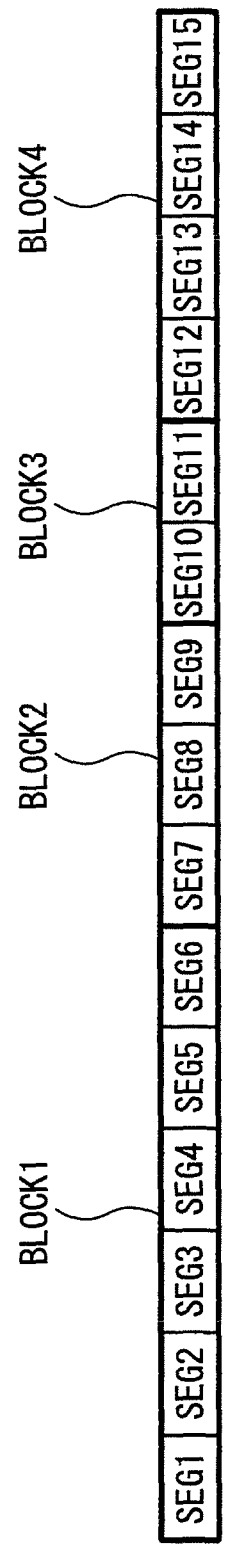
FIG. 19 is a diagram schematically showing segment arrangement in the case of blocking segments constructing a cubic curve indicating a movement path.

FIG. 19 is a diagram schematically showing segment arrangement in the case of blocking segments SEG1 to SEG13 constructing a PCC curve indicating a movement path. As shown in FIG. 19, a limiting speed calculation module (Vd2 calculation module of FIG. 6) 411*a*_5 of a movement speed calculation module 411*a* gathers segments with the same or approximate effective radius R3 into blocks BLOCK1 to BLOCK4. Accordingly, the movement speed calculation module 411*a* calculates maximum speeds VBi for the blocks BLOCK1 to BLOCK4. A coordinate measuring machine 1 could control a movement speed of a probe 17 based on the maximum speed VBi set every block.

Figure 20:
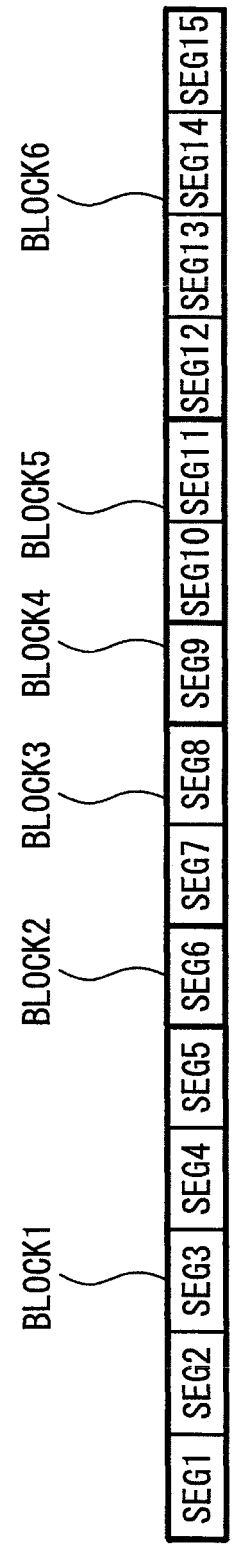
FIG. 20 is a diagram schematically showing segment arrangement in the case where a segment whose effective radius R is not the same or approximate is present between blocks.

In addition, FIG. 19 shows the example of blocking all the segments, but a segment whose effective radius R is not the same or approximate may be present between blocks. FIG. 20 is a diagram schematically showing segment arrangement in the case where a segment whose effective radius R is not the same or approximate is present between blocks. Similarly in this case, the coordinate measuring machine 1 could control the movement speed based on the maximum speed set every block and every segment which is not blocked. In addition, in this case, the segment which is not blocked (that is, a single segment) can be treated as one block. Consequently, in FIG. 20, the blocks and the segments which are not blocked are displayed as blocks BLOCK1 to BLOCK6.

In addition, in the case of blocking segments, for example, variations in the effective radius R could be provided with an allowable range. For example, the variations could be defined as the range within x % of the average value of the effective radii R of the blocked segments.

Accordingly, speed variations due to a difference in a slight maximum speed between segments by blocking can be prevented. As a result, vibration etc. generated in the coordinate measuring machine 1 can be presented to increase accuracy of shape measurement.

Fourth Embodiment

Next, a shape measuring apparatus 400 according to a fourth embodiment will be described. In the shape measuring apparatus 400, the speed pattern deciding method described in the second embodiment is applied to the shape measuring apparatus 300 according to the third embodiment. In the third embodiment, the speed pattern is set for each segment. However, the speed pattern deciding method described in the second embodiment can be applied by treating blocks created by the shape measuring apparatus 400 according to the fourth embodiment as one block. In this case, the speed pattern can be allocated to each of the blocks and the segments which are not blocked.

According to the present embodiment, the number of executions of an algorithm necessary to decide the speed pattern can be reduced greatly. As a result, a speedup in shape measurement can be achieved. Further, the number of accelerations and decelerations can be reduced by blocking, so that vibration etc. generated in a coordinate measuring machine 1 can further be presented to increase accuracy of shape measurement.

In addition, the invention is not limited to the embodiments described above, and changes can properly be made without departing from the gist. In the embodiments described above, the shape measuring apparatus having the coordinate measuring machine is described. However, the control method of the shape measuring apparatus according to the embodiments described above can be applied to any measuring apparatus for moving a probe in a curve path, a machine tool for moving a machining part such as a cutting tool in a curve path, etc.

In the embodiments described above, the PCC curve is used as the movement path of the probe, but this is only illustrative. Hence, cubic curves or quartic or more curves other than the PCC can naturally be used as the movement path of the probe. The control method of the shape measuring apparatus according to the embodiments described above can be applied by dividing the cubic curves or the quartic or more curves other than the PCC into plural segments.

A part or all of the embodiments described above can be described as shown in the following appendixes, but is not limited to the following.

APPENDIX 1

A control method of a shape measuring apparatus comprising:
dividing a curve indicating a movement path of a probe into a plurality of sections;
selecting a measurement target section from the plurality of sections sequentially from a starting point side of the curve indicating the movement path of the probe;
calculating a first curvature radius from a curvature of the measurement target section;
calculating a second curvature radius according to an angle between a first straight line connecting a starting point to an ending point of the measurement target section and a second straight line connecting a starting point to an ending point of a section next to the measurement target section;
selecting a smaller value from among the first curvature radius and the second curvature radius as an effective radius; and
calculating a maximum speed of probe movement increasing according to an increase in the effective radius for the measurement target section.

APPENDIX 2

The control method of a shape measuring apparatus as described in appendix 1, comprising:
dividing the measurement target section into a plurality of division curves; and calculating a minimum radius of a circle which has the minimum radius and passes through three continuous points of a starting point of the measurement target section, an ending point of the measurement target section and a division point at which the measurement target section is divided into the plurality of division curves as the first curvature radius.

APPENDIX 3

The control method of a shape measuring apparatus as described in appendix 1 or 2, wherein the maximum speed is expressed by a square root function of the effective radius when the effective radius is smaller than a first value, and is expressed by a linear function of the effective radius when the effective radius is larger than the first value.

APPENDIX 4

The control method of a shape measuring apparatus as described in any one of appendixes 1 to 3, wherein a speed pattern for moving the probe is decided based on the maximum speed

APPENDIX 5

The control method of a shape measuring apparatus as described in appendix 4, comprising:
comparing a first maximum speed which is the maximum speed of the measurement target section with a second maximum speed which is the maximum speed of the section next to the measurement target section; and
setting the first maximum speed as a terminal speed of the measurement target section when the first maximum speed is lower than or equal to the second maximum speed, and setting the second maximum speed as the terminal speed of the measurement target section when the first maximum speed is higher than the second maximum speed

APPENDIX 6

The control method of a shape measuring apparatus as described in appendix 5, comprising:
when an initial speed of the measurement target section is equal to the terminal speed, selecting a speed pattern in which the probe is moved from the starting point to the ending point of the measurement target section while maintaining a constant speed at the initial speed

APPENDIX 7

The control method of a shape measuring apparatus as described in appendix 5, comprising:
when the initial speed of the measurement target section is lower than the terminal speed, calculating a first distance of movement of the probe while accelerating from the initial speed to the terminal speed with preset acceleration; and comparing the first distance with a length of the measurement target section.

APPENDIX 8

The control method of a shape measuring apparatus as described in appendix 7, comprising:
when the first distance is equal to a length of the measurement target section, selecting a speed pattern in which acceleration is made from the initial speed to the terminal speed with the preset acceleration.

APPENDIX 9

The control method of a shape measuring apparatus as described in appendix 7, comprising:
when the first distance is shorter than to a length of the measurement target section and the terminal speed is equal to the first maximum speed, selecting a speed pattern in which constant speed movement is performed at the terminal speed after acceleration is made from the initial speed to the terminal speed.

APPENDIX 10

The control method of a shape measuring apparatus as described in appendix 7, comprising:
when the first distance is shorter than to a length of the measurement target section and the terminal speed is different from the first maximum speed, calculating a maximum reach speed in the case where acceleration is made from the initial speed to the maximum reach speed with the preset acceleration and thereafter deceleration is made from the maximum reach speed to the terminal speed and the probe is moved from the starting point to the ending point of the measurement target section.

APPENDIX 11

The control method of a shape measuring apparatus as described in appendix 10, comprising:
when the maximum reach speed is lower than or equal to the first maximum speed, selecting a speed pattern in which deceleration is made from the maximum reach speed to the terminal speed after acceleration is made from the initial speed to the maximum reach speed with the preset acceleration.

APPENDIX 12

The control method of a shape measuring apparatus as described in appendix 10, comprising:
when the maximum reach speed is higher than the first maximum speed, selecting a speed pattern in which acceleration is made from the initial speed to the first maximum speed with the preset acceleration and constant speed movement is performed at the first maximum speed and deceleration is made from the first maximum speed to the terminal speed with the preset acceleration.

APPENDIX 13

The control method of a shape measuring apparatus as described in appendix 5, comprising:
when an initial speed of the measurement target section is higher than the terminal speed, calculating a second distance of movement of the probe while decelerating from the initial speed to the terminal speed with preset acceleration, and comparing the second distance with a length of the measurement target section.

APPENDIX 14

The control method of a shape measuring apparatus as described in appendix 13, comprising:
when the second distance is equal to a length of the measurement target section, selecting a speed pattern in which deceleration is made from the initial speed to the terminal speed with the preset acceleration.

APPENDIX 15

The control method of a shape measuring apparatus as described in appendix 13, comprising:
when the second distance is shorter than to a length of the measurement target section and the terminal speed is equal to the first maximum speed, selecting a speed pattern in which acceleration is made to the terminal speed after constant speed movement is performed at the initial speed.

APPENDIX 16

The control method of a shape measuring apparatus as described in appendix 13, comprising:
when the second distance is shorter than to a length of the measurement target section and the terminal speed is different from the first maximum speed, calculating a maximum reach speed in the case where acceleration is made from the initial speed to the maximum reach speed with the preset acceleration and thereafter deceleration is made from the maximum reach speed to the terminal speed and the probe is moved from the starting point to the ending point of the measurement target section.

APPENDIX 17

The control method of a shape measuring apparatus as described in appendix 16, comprising:
when the maximum reach speed is lower than or equal to the first maximum speed, selecting a speed pattern in which deceleration is made from the maximum reach speed to the terminal speed after acceleration is made from the initial speed to the maximum reach speed with the preset acceleration.

APPENDIX 18

The control method of a shape measuring apparatus as described in appendix 16, comprising:
when the maximum reach speed is higher than the first maximum speed, selecting a speed pattern in which acceleration is made from the initial speed to the first maximum speed with the preset acceleration and constant speed movement is performed at the first maximum speed and deceleration is made from the first maximum speed to the terminal speed with the preset acceleration.

APPENDIX 19

The control method of a shape measuring apparatus as described in any one of appendixes 1 to 3, comprising:
gathering the two or more sections, in which the effective radius is within a predetermined range, of the plurality of sections as one block; and
calculating a maximum speed of probe movement increasing according to an increase in a fourth curvature radius which is a representative value of the effective radius of the measurement target section included in the block for the block.

APPENDIX 20

The control method of a shape measuring apparatus as described in any one of appendixes 4 to 18, comprising:
gathering the two or more sections, in which the effective radius is within a predetermined range, of the plurality of sections as one block;
calculating a maximum speed of probe movement increasing according to an increase in a representative value of the effective radius of the measurement target section included in the block; and
selecting the speed pattern for moving the probe in the block.

APPENDIX 21

The control method of a shape measuring apparatus as described in appendix 19 or 20, wherein the representative value is an average value of the effective radii of the measurement target section included in the block.

APPENDIX 22

The control method of a shape measuring apparatus as described in any one of appendixes 1 to 21, wherein the curve indicating the movement path of the probe is parametric cubic curves.

APPENDIX 23

A shape measuring apparatus comprises:
a path information division module configured to divide a curve indicating a movement path of a probe into a plurality of sections; and
a movement speed calculation module configured to select a measurement target section from the plurality of sections sequentially from a starting point side of the curve indicating the movement path of the probe and calculating a maximum speed of probe movement for the measurement target section,
wherein
the path information division module is configured to calculate a first curvature radius from a curvature of the measurement target section, and
the movement speed calculation module comprises:
a second radius calculation module configured to calculate a second curvature radius according to an angle between a first straight line connecting a starting point to an ending point of the measurement target section and a second straight line connecting a starting point to an ending point of a section next to the measurement target section,
an effective radius setting module configured to select a smaller value from among the first curvature radius and the second curvature radius as an effective radius, and
a maximum speed calculation module configured to calculate a maximum speed of probe movement increasing according to an increase in the effective radius for the measurement target section.

APPENDIX 24

The shape measuring apparatus as described in appendix 23, wherein the path information division module divides the measurement target section into a plurality of division curves, and calculates a minimum radius of a circle which has the minimum radius and passes through three continuous points of a starting point of the measurement target section, an ending point of the measurement target section and a division point at which the measurement target section is divided into the plurality of division curves as the first curvature radius.

APPENDIX 25

The shape measuring apparatus as described in appendix 23 or 24, wherein the maximum speed is expressed by a square root function of the effective radius when the effective radius is smaller than a first value, and is expressed by a linear function of the effective radius when the effective radius is larger than the first value.

APPENDIX 26

The shape measuring apparatus as described in any one of appendixes 23 to 25, comprising:
a speed pattern selection module configured to select a speed pattern for moving the probe based on the maximum speed.

APPENDIX 27

The shape measuring apparatus as described in appendix 26, wherein the speed pattern selection module compares a first maximum speed which is the maximum speed of the measurement target section with a second maximum speed which is the maximum speed of the section next to the measurement target section, and sets the first maximum speed as a terminal speed of the measurement target section when the first maximum speed is lower than or equal to the second maximum speed, and sets the second maximum speed as the terminal speed of the measurement target section when the first maximum speed is higher than the second maximum speed.

APPENDIX 28

The shape measuring apparatus as described in appendix 27, wherein when an initial speed of the measurement target section is equal to the terminal speed, the speed pattern selection module selects a speed pattern in which a constant speed is maintained at the initial speed and the probe is moved from the starting point to the ending point of the measurement target section.

APPENDIX 29

The shape measuring apparatus as described in appendix 27, wherein when the initial speed of the measurement target section is lower than the terminal speed, the speed pattern selection module calculates a first distance of movement of the probe while accelerating from the initial speed to the terminal speed with preset acceleration, and compares the first distance with a length of the measurement target section.

APPENDIX 30

The shape measuring apparatus as described in appendix 29, wherein when the first distance is equal to a length of the measurement target section, the speed pattern selection module selects a speed pattern in which acceleration is made from the initial speed to the terminal speed with the preset acceleration.

APPENDIX 31

The shape measuring apparatus as described in appendix 29, wherein when the first distance is shorter than to a length of the measurement target section and the terminal speed is equal to the first maximum speed, the speed pattern selection module selects a speed pattern in which constant speed movement is performed at the terminal speed after acceleration is made from the initial speed to the terminal speed.

APPENDIX 32

The shape measuring apparatus as described in appendix 29, wherein when the first distance is shorter than to a length of the measurement target section and the terminal speed is different from the first maximum speed, the speed pattern selection module calculates a maximum reach speed in the case where acceleration is made from the initial speed to the maximum reach speed with the preset acceleration and thereafter deceleration is made from the maximum reach speed to the terminal speed and the probe is moved from the starting point to the ending point of the measurement target section.

APPENDIX 33

The shape measuring apparatus as described in appendix 32, wherein when the maximum reach speed is lower than or equal to the first maximum speed, the speed pattern selection module selects a speed pattern in which deceleration is made from the maximum reach speed to the terminal speed after acceleration is made from the initial speed to the maximum reach speed with the preset acceleration.

APPENDIX 34

The shape measuring apparatus as described in appendix 32, wherein when the maximum reach speed is higher than the first maximum speed, the speed pattern selection module selects a speed pattern in which acceleration is made from the initial speed to the first maximum speed with the preset acceleration and constant speed movement is performed at the first maximum speed and deceleration is made from the first maximum speed to the terminal speed with the preset acceleration.

APPENDIX 35

The shape measuring apparatus as described in appendix 27, wherein when an initial speed of the measurement target section is higher than the terminal speed, the speed pattern selection module calculates a second distance of movement of the probe while decelerating from the initial speed to the terminal speed with preset acceleration, and compares the second distance with a length of the measurement target section.

APPENDIX 36

The shape measuring apparatus as described in appendix 35, wherein when the second distance is equal to a length of the measurement target section, the speed pattern selection module selects a speed pattern in which deceleration is made from the initial speed to the terminal speed with the preset acceleration.

APPENDIX 37

The shape measuring apparatus as described in appendix 35, wherein when the second distance is shorter than to a length of the measurement target section and the terminal speed is equal to the first maximum speed, the speed pattern selection module selects a speed pattern in which acceleration is made to the terminal speed after constant speed movement is performed at the initial speed.

APPENDIX 38

The shape measuring apparatus as described in appendix 35, wherein when the second distance is shorter than to a length of the measurement target section and the terminal speed is different from the first maximum speed, the speed pattern selection module calculates a maximum reach speed in the case where acceleration is made from the initial speed to the maximum reach speed with the preset acceleration and thereafter deceleration is made from the maximum reach speed to the terminal speed and the probe is moved from the starting point to the ending point of the measurement target section.

APPENDIX 39

The shape measuring apparatus as described in appendix 38, wherein when the maximum reach speed is lower than or equal to the first maximum speed, the speed pattern selection module selects a speed pattern in which deceleration is made from the maximum reach speed to the terminal speed after acceleration is made from the initial speed to the maximum reach speed with the preset acceleration.

APPENDIX 40

The shape measuring apparatus as described in appendix 38, wherein when the maximum reach speed is higher than the first maximum speed, the speed pattern selection module selects a speed pattern in which acceleration is made from the initial speed to the first maximum speed with the preset acceleration and constant speed movement is performed at the first maximum speed and deceleration is made from the first maximum speed to the terminal speed with the preset acceleration.

APPENDIX 41

The shape measuring apparatus as described in any one of appendixes 23 to 25, wherein the movement speed calculation module gathers the two or more sections, in which the effective radius is within a predetermined range, of the plurality of sections as one block, and calculates a maximum speed of probe movement increasing according to an increase in a fourth curvature radius which is a representative value of the effective radius of the measurement target section included in the block for the block.

APPENDIX 42

The shape measuring apparatus as described in appendix 41, wherein the representative value is an average value of the effective radii of the measurement target section included in the block.

APPENDIX 43

The shape measuring apparatus as described in any one of appendixes 26 to 40, wherein the speed pattern selection module gathers the two or more sections, in which the effective radius is within a predetermined range, of the plurality of sections as one block, and calculates a maximum speed of probe movement increasing according to an increase in a representative value of the effective radius of the measurement target section included in the block, and selects the speed pattern for moving the probe in the block.

APPENDIX 44

The shape measuring apparatus as described in appendix 43, wherein the representative value is an average value of the effective radii of the measurement target section included in the block.

APPENDIX 45

The shape measuring apparatus as described in any one of appendixes 23 to 40, comprising:
a coordinate measuring machine having a first arithmetic module; and
a control device which has a second arithmetic module and is configured to control the coordinate measuring machine,
wherein the movement speed calculation module is included in the first arithmetic module, and the path information division module is included in the second arithmetic module.

APPENDIX 46

The shape measuring apparatus as described in any one of appendixes 26 to 40, 43, 44, comprising:
a coordinate measuring machine having a first arithmetic module;
a control device which has a second arithmetic module and is configured to control the coordinate measuring machine; and
a speed pattern section module configured to select a speed pattern for moving the probe based on the maximum speed,
wherein the movement speed calculation module and the speed pattern selection module are included in the first arithmetic module, and the path information division module is included in the second arithmetic module.

APPENDIX 47

The shape measuring apparatus as described in any one of appendixes 23 to 46, wherein the curve indicating the movement path of the probe is parametric cubic curves.

What is claimed is:
1. An improved control method of controlling a shape measuring apparatus according to a calculated maximum speed, the method comprising:
dividing a curve indicating a movement path of a probe into a plurality of sections;
selecting a measurement target section from the plurality of sections sequentially from a starting point side of the curve indicating the movement path of the probe;
calculating a first curvature radius from a curvature of the measurement target section;
calculating a second curvature radius according to an angle between a first straight line connecting a starting point to an ending point of the measurement target section and a second straight line connecting a starting point to an ending point of a section next to the measurement target section;
selecting a smaller value from among the first curvature radius and the second curvature radius as an effective radius; and
calculating a maximum speed of probe movement increasing according to an increase in the effective radius for the measurement target section.

2. The control method of a shape measuring apparatus as claimed in claim 1, comprising:
dividing the measurement target section into a plurality of division curves; and
calculating a minimum radius of a circle which has the minimum radius and passes through three continuous points of a starting point of the measurement target section, an ending point of the measurement target section and a division point at which the measurement target section is divided into the plurality of division curves as the first curvature radius.

3. The control method of a shape measuring apparatus as claimed in claim 1, wherein the curve indicating the movement path of the probe is parametric cubic curves.

4. The control method of a shape measuring apparatus as claimed in claim 1, further comprising, in a scanning operation of the shape measuring apparatus, controlling the movement of the probe based on the calculated maximum speed.

5. The control method of a shape measuring apparatus as claimed in claim 1, comprising:
gathering the two or more sections, in which the effective radius is within a predetermined range, of the plurality of sections as one block; and
calculating a maximum speed of probe movement increasing according to an increase in a fourth curvature radius which is a representative value of the effective radius of the measurement target section included in the block for the block.

6. The control method of a shape measuring apparatus as claimed in claim 5, wherein the representative value is an average value of the effective radii of the measurement target section included in the block.

7. The control method of a shape measuring apparatus as claimed in claim 1, wherein a speed pattern for moving the probe is decided based on the maximum speed.

8. The control method of a shape measuring apparatus as claimed in claim 7, comprising:
gathering the two or more sections, in which the effective radius is within a predetermined range, of the plurality of sections as one block;
calculating a maximum speed of probe movement increasing according to an increase in a representative value of the effective radius of the measurement target section included in the block; and selecting the speed pattern for moving the probe in the block.

9. The control method of a shape measuring apparatus as claimed in claim 7, comprising:
comparing a first maximum speed which is the maximum speed of the measurement target section with a second maximum speed which is the maximum speed of the section next to the measurement target section; and
setting the first maximum speed as a terminal speed of the measurement target section when the first maximum speed is lower than or equal to the second maximum speed, and setting the second maximum speed as the terminal speed of the measurement target section when the first maximum speed is higher than the second maximum speed.

10. The control method of a shape measuring apparatus as claimed in claim 9, comprising:
when an initial speed of the measurement target section is equal to the terminal speed, selecting a speed pattern in which the probe is moved from the starting point to the ending point of the measurement target section while maintaining a constant speed at the initial speed.

11. The control method of a shape measuring apparatus as claimed in claim 9, comprising:
when the initial speed of the measurement target section is lower than the terminal speed, calculating a first distance of movement of the probe while accelerating from the initial speed to the terminal speed with preset acceleration; and
comparing the first distance with a length of the measurement target section.

12. The control method of a shape measuring apparatus as claimed in claim 9, comprising:
when an initial speed of the measurement target section is higher than the terminal speed, calculating a second distance of movement of the probe while decelerating from the initial speed to the terminal speed with preset acceleration, and comparing the second distance with a length of the measurement target section.

13. A shape measuring apparatus comprising:
a path information division module configured to divide a curve indicating a movement path of a probe into a plurality of sections; and
a movement speed calculation module configured to select a measurement target section from the plurality of sections sequentially from a starting point side of the curve indicating the movement path of the probe and calculating a maximum speed of probe movement for the measurement target section,
wherein
the path information division module is configured to calculate a first curvature radius from a curvature of the measurement target section, and
the movement speed calculation module comprises:
a second radius calculation module configured to calculate a second curvature radius according to an angle between a first straight line connecting a starting point to an ending point of the measurement target section and a second straight line connecting a starting point to an ending point of a section next to the measurement target section,
an effective radius setting module configured to select a smaller value from among the first curvature radius and the second curvature radius as an effective radius, and
a maximum speed calculation module configured to calculate a maximum speed of probe movement increasing according to an increase in the effective radius for the measurement target section.

14. The shape measuring apparatus as claimed in claim 13 comprising:
a coordinate measuring machine having a first arithmetic module; and
a control device which has a second arithmetic module and is configured to control the coordinate measuring machine,
wherein the movement speed calculation module is included in the first arithmetic module, and the path information division module is included in the second arithmetic module.

15. The shape measuring apparatus as claimed in claim 13, comprising:
a coordinate measuring machine having a first arithmetic module;
a control device which has a second arithmetic module and is configured to control the coordinate measuring machine; and
a speed pattern section module configured to select a speed pattern for moving the probe based on the maximum speed,
wherein the movement speed calculation module and the speed pattern selection module are included in the first arithmetic module, and the path information division module is included in the second arithmetic module.

* * * * *